United States Patent
Kobayashi et al.

(10) Patent No.: US 7,259,314 B2
(45) Date of Patent: Aug. 21, 2007

(54) WAVEFORM DATA PROCESSING APPARATUS

(75) Inventors: Hironari Kobayashi, Hamamatsu (JP); Mitsutaka Goto, Hamamatsu (JP)

(73) Assignee: Yamaha Corporation, Hamamatsu-shi (JP)

(*) Notice: Subject to any disclaimer, the term of this patent is extended or adjusted under 35 U.S.C. 154(b) by 0 days.

(21) Appl. No.: 11/391,866

(22) Filed: Mar. 28, 2006

(65) Prior Publication Data

US 2006/0225561 A1 Oct. 12, 2006

(30) Foreign Application Priority Data

Mar. 28, 2005 (JP) ............... 2005-090763
Mar. 28, 2005 (JP) ............... 2005-090764

(51) Int. Cl.
*G10H 7/00* (2006.01)
(52) U.S. Cl. ........................ 84/604
(58) Field of Classification Search ........... 84/603, 84/604, 605, 606, 607; 700/94
See application file for complete search history.

(56) References Cited

U.S. PATENT DOCUMENTS

| | | | | |
|---|---|---|---|---|
| 6,044,434 | A * | 3/2000 | Oliver | 711/110 |
| 6,300,553 | B2 * | 10/2001 | Kumamoto et al. | 84/622 |
| 6,441,290 | B2 | 8/2002 | Fujita et al. | |
| 6,751,167 | B2 * | 6/2004 | Yamada et al. | 369/30.19 |
| 2002/0045962 | A1 | 4/2002 | Kobayashi | |

FOREIGN PATENT DOCUMENTS

JP 2003-323174 11/2003

* cited by examiner

*Primary Examiner*—Lincoln Donovan
*Assistant Examiner*—Andrew Millikin
(74) *Attorney, Agent, or Firm*—Morrison & Foerster LLP

(57) ABSTRACT

In a waveform data processing apparatus, a transfer section reads out waveform data of multiple tracks stored in a first storage device in data units, and transfers the read waveform data to a second storage device having an access speed higher than an access speed of the first storage device. A reproduction section reads out the waveform data of the tracks from the second storage device for every sampling period, and which reproduces an audio signal according to the read waveform data. A control section replaces old waveform data which has been read from the second storage device by new waveform data which is read from the first storage device, whereby the audio signals of the tracks are continuously reproduced. The control section controls the transfer section to transfer, from the first storage device to track regions provided in the second storage device for respective tracks, pieces of the waveform data corresponding to the respective track regions, in an order of the tracks having a smaller number samples of non-reproduced waveform data or in an order of the tracks having a smaller number units of non-reproduced waveform data.

14 Claims, 15 Drawing Sheets

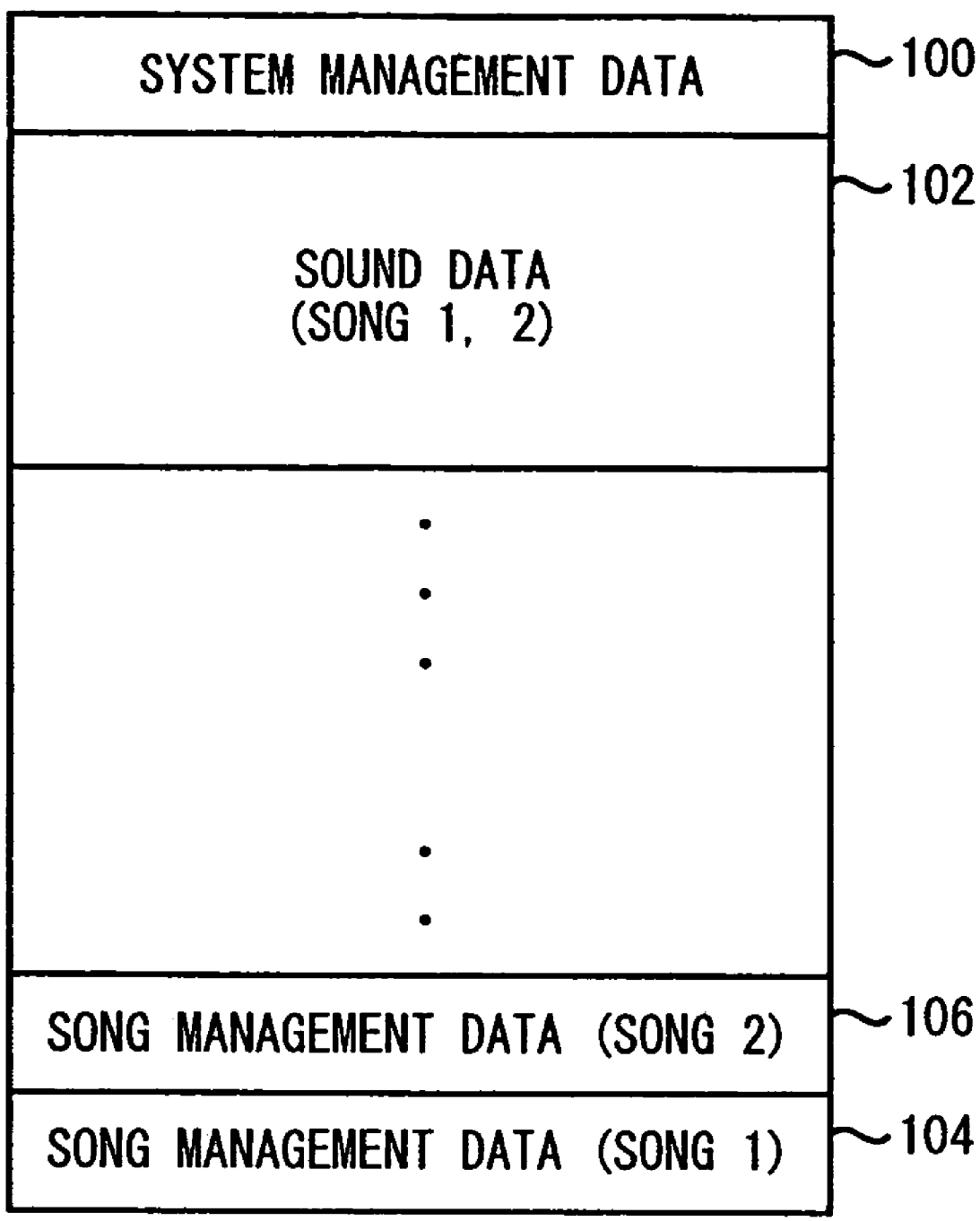

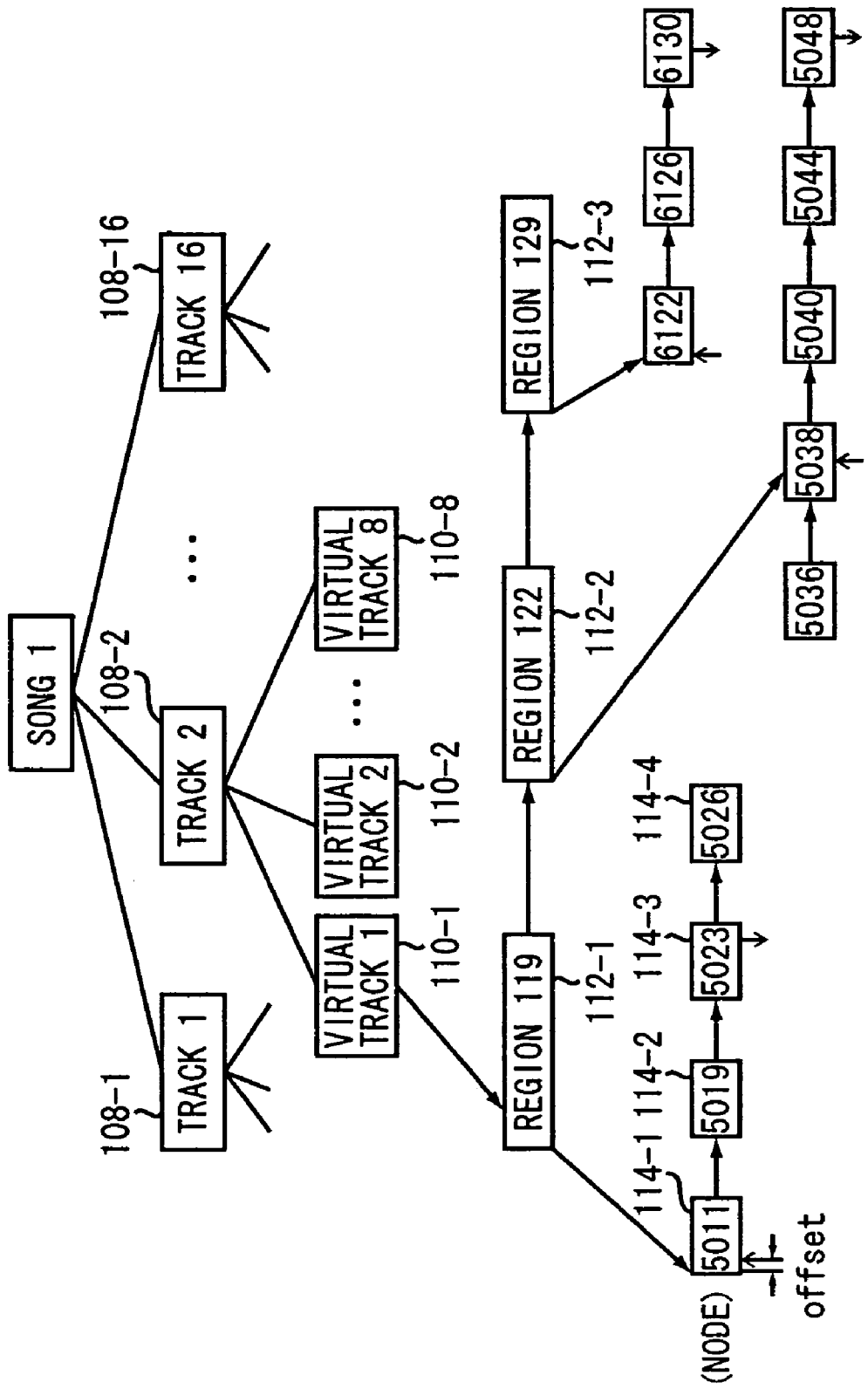

TYPE OF NUDGE

STATE OF BUFFER MEMORY

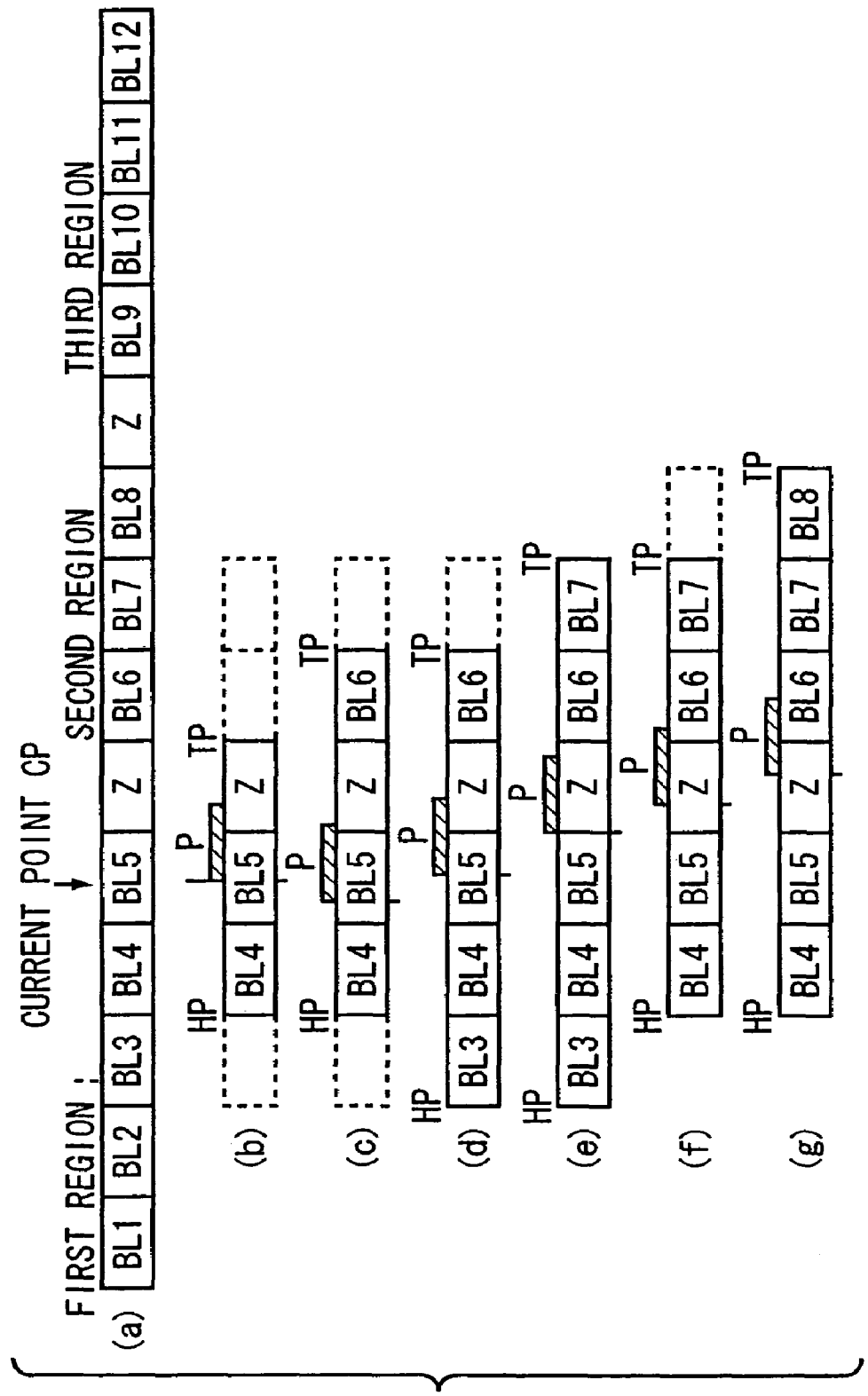

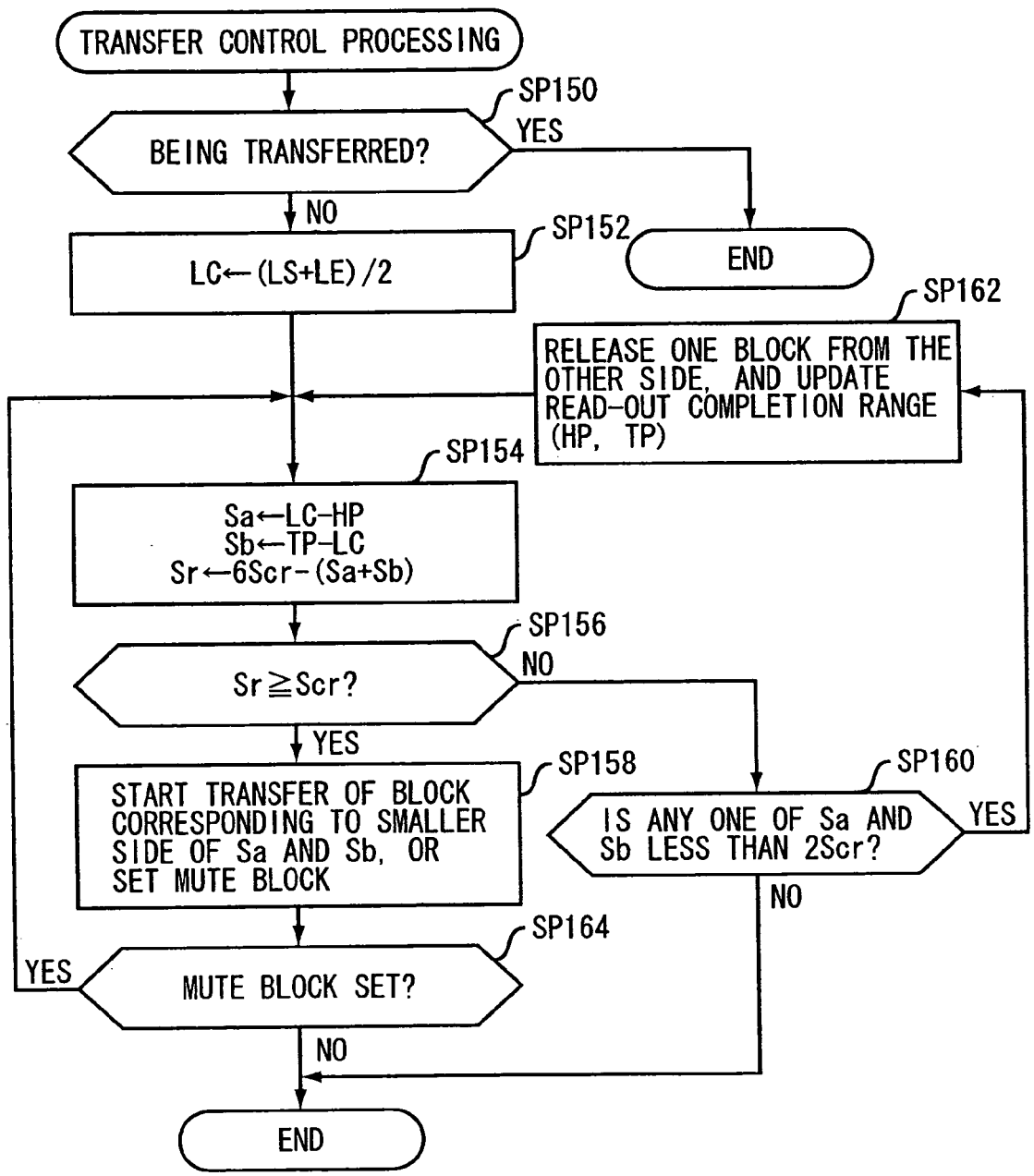

WAVEFORM DATA PROCESSING APPARATUS

BACKGROUND OF THE INVENTION

1. Technical Field of the Invention

The present invention relates to a data processing apparatus suitable for use in recording and reproducing of waveform data using a recording medium such as a hard disk.

2. Related Art

In Japanese Patent Laid-open Publication No. 2003-323174, a hard disk recorder is disclosed which is an apparatus for not only writing waveform data of multiple tracks recorded on a hard disk into a buffer memory for reproduction of the waveform data, but also recording waveform data written in the buffer memory on the hard disc. In this apparatus, track regions are respectively allocated to tracks constituting one piece of music (a song) in the buffer memory. Each track region consists of a plurality of buffer regions each having a memory capacity corresponding to one cluster. When reproduction of waveform data for one buffer region of one track is completed, the apparatus carries out reproduction of waveform data for another buffer region while transferring new waveform data from the hard disk to the former buffer region. Thus, the apparatus can reproduce a series of waveform data while continuously writing the waveform data.

In the technique of Japanese Patent Laid-open Publication No. 2003-323174, the contents of the music piece are specified by waveform data and song management data. Here, "song management data" defines one or more regions for which waveform data is actually reproduced, and respective reproduction timings for the regions. Accordingly, when it is necessary to edit a music piece through cutting or additing of a portion of a series of waveform data, the editing can be actually achieved by editing the song management data without editing the waveform data itself.

In the above-mentioned technique, however, transfer of new waveform data from the hard disk for each track region is carried out under the condition "reproduction of waveform data has been completed for one buffer region of the track region". In a state where reproduction of waveform data has been completed for one buffer region of each of the track regions corresponding to a plurality of tracks, waveform data is transferred to respective track regions in a reproduction completion order. Such an operation incurs no problem if each track region has a sufficient number of samples, for which reproduction has not yet been completed. However, where the contents of the music piece are specified by waveform data and song management data, waveform data transferred to one buffer region may not be completely reproduced even when the amount of the transferred data may be actually within "one cluster". Only a portion of the waveform data designated by the song management data is reproduced.

When there is a track with a very small reproduction region for waveform data not yet reproduced, the reproduction time of the waveform data is very short. For this reason, there is a possibility that transfer of subsequently-required waveform data may not be achieved within the reproduction time of the waveform data being reproduced. In order to avoid such a situation, it is necessary to frequently re-edit waveform data such that clusters having a very small reproduction region are eliminated, in the technique of Japanese Patent Laid-open Publication No. 2003-323174. However, such a task is very troublesome.

Although not specified in Japanese Patent Laid-open Publication No. 2003-323174, conventional hard disk recorders have a reproduction function referred to as "nudge". This is a function for repeatedly loop-reproducing a short period (for example, 25 to 800 msec) of a loop part of a song. However, in the nudge function, when the loop part considerably approximates to an edge of the waveform data storing range in a buffer region (in detail, when the number of samples between the edge of the waveform data storing range in the buffer region and the center of the loop part is less than "½ cluster"), waveform data successive to the edge is transferred from the hard disk to the buffer region. Here, the loop part is settable only for samples already written in the buffer region. For this reason, when it is desired to greatly shift the position of the loop part, there may be a problem in operating the shift of the loop part because supplement of waveform data cannot be achieved within a given time.

SUMMARY OF THE INVENTION

The present invention has been made in view of the above-mentioned problems, and it is an object of the invention to provide a waveform data processing apparatus which is capable of reproducing waveform data without any problems even when there is a cluster having a very short reproduction range. Further, it is another object of the invention to provide a waveform data processing apparatus which is capable of writing waveform data with a redundancy at forward and rearward sides of the loop part.

In order to solve the above problems, the present invention is characterized by a configuration described below. In accordance with one aspect, the present invention provides a waveform data processing apparatus comprising a transfer section which reads out waveform data of multiple tracks stored in a first storage device in data units, each data unit being made up of a predetermined number of samples, and which transfers the read waveform data to a second storage device having an access speed higher than an access speed of the first storage device; a reproduction section which reads out, one sample by one sample, the waveform data of each of the tracks from the second storage device for every sampling period, and which reproduces an audio signal according to the read waveform data; and a transfer control section which replaces old waveform data which has been read from the second storage device by new waveform data which is read from the first storage device, whereby the audio signals of each of the tracks are continuously reproduced, wherein the transfer control section controls the transfer section to transfer, from the first storage device to track regions provided in the second storage device for respective tracks, pieces of the waveform data corresponding to the respective track regions, in an order of the tracks having a smaller number samples of non-reproduced waveform data or in an order of the tracks having a smaller number units of non-reproduced waveform data.

Preferably, the transfer control section includes: an additional transfer determination section which determines whether or not waveform data can be further transferred to the second storage device, in response to completion of the transfer of waveform data of one data unit from the first storage device to the second storage device in association with one of the tracks; and an additional transfer instructing section which instructs the transfer section to continuously transfer new waveform data of another data unit to the second storage device, under a condition that the results of the determination by the additional transfer determination section is affirmative.

Preferably, the inventive waveform data processing apparatus further comprises: a mute flag storing section which stores a mute flag for every block of waveform data having a size not larger than the data unit, the mute flag designating whether or not the audio signal associated with the block in question is to be muted when the block in question is reproduced; and a mute section which mutes the audio signal in a period during which the block-designated to be muted by the mute flag is reproduced.

Preferably, the second storage device has each track region which includes at least three buffer regions each having a storage capacity corresponding to the data unit. The inventive apparatus further comprises a designation section which designates one of the buffer regions as a first buffer region, and designates another one of the buffer regions as a second buffer region, wherein the reproduction section begins reproduction of the first buffer region when reproduction of the second buffer region is completed, and reproduces the buffer regions except for the first and second buffer regions in a predetermined default reproduction order.

In one form, the inventive waveform data processing apparatus comprises: a first storage device which stores sound data in storage units of clusters; a second storage device which includes a plurality of storage regions each capable of storing sound data of one cluster, and each capable of setting therein a reproduction range, and which has an access speed higher than an access speed of the first storage device, the plurality of the storage regions comprising at least three storage regions usable for reproduction of sound data in a predetermined order; a third storage device which stores management data indicating a plurality of blocks, to be sequentially reproduced for a track, the management data designating sound data of one cluster stored in the first storage device for an associated one of the blocks, and designating a reproduction range of the sound data to be reproduced as one block;. a reproduction section which performs reproduction of the plurality of the storage regions in a predetermined order, the reproduction section reproducing the designated reproduction range of the sound data in each storage region; and a next block preparation section which sequentially prepares next block reproduction for a storage region of the second storage device, for which reproduction has been completed by the reproduction section, based on the management data, the next block preparation section reading out the sound data of one cluster for a next block from the first storage device, based on the management data, then transferring the read sound data to the reproduction-completed storage region where the reproduction has been completed, and setting a. reproduction range of the sound data for the next block.

In another form, the inventive waveform data processing apparatus comprises: a first storage device which stores sound data in storage units of clusters; a second storage device which includes a plurality of storage regions usable for reproduction of sound data in a predetermined order, each of the storage regions being capable of storing sound data of one cluster, and being capable of setting the sound data to be reproduced in the form of sound or mute, and which has an access speed higher than an access speed of the first storage device; a third storage device which stores management data indicating a plurality of sound blocks or mute blocks, to be sequentially reproduced for a track, the management data designating sound data of one cluster stored in the first storage device for an associated one of the sound blocks, and designating a reproduction range of the sound data to be reproduced for the sound block, while designating a time length for each of the mute blocks; a reproduction section which performs reproduction of the plurality of the storage regions in a predetermined order, the reproduction section reproducing the stored sound data of the storage regions set to be reproduced in the form of sound, while muting the stored sound data of the storage regions set to be reproduced in the form of mute; and a next block preparation section which sequentially prepares next block reproduction for a storage region of the second storage device, for which reproduction has been completed by the reproduction section, based on the management data, the next block preparation section setting reproduction of sound for the storage region where the reproduction is completed in association with a next block designated by the management data, when the next block is a sound block, by reading out the sound data of one cluster for the next block from the first storage device, and transferring the read sound data to the storage region where the reproduction has been completed, while setting reproduction of mute for the. storage region where the reproduction has been completed when the next block designated by the management data is a mute block.

In a further form, the inventive waveform data processing apparatus is designed for simultaneously reproducing sound data of multiple tracks, and comprises: a first storage device which stores sound data in storage units of clusters; a second storage device which includes, for each of the tracks, a plurality of storage regions each capable of storing sound data of one cluster, and each capable of setting therein a reproduction range, and which has an access speed higher than an access speed of the first storage device, the plurality of the storage regions comprising at least three storage regions usable for reproduction of the sound data in a predetermined order for each track; a third storage device which stores management data indicating a plurality of blocks, to be sequentially reproduced, in each of the tracks, the management data designating sound data of one cluster stored in the first storage device for one block, and designating a reproduction range of the sound data to be reproduced for the one block; a reproduction section which performs reproduction of the plurality of the storage regions in a predetermined order for each of the tracks, the reproduction section reproducing the designated reproduction range of the sound data in each storage region; and a next block preparation section which prepares next block reproduction for a storage region for which reproduction has been completed, based on the management data of one track where the reproduction of the storage region is completed, the next block preparation section reading out the sound data of one cluster for a next block from the first storage device, based on the management data associated with the track, transferring the read sound data to an associated one of the storage regions for which the reproduction has been completed, and setting a reproduction range of the sound data for the next block, wherein, when there are at least two of the tracks where reproduction of storage regions have been completed, the next block preparation section prepares the next block reproduction in an order of tracks including non-reproduced storage regions having a smaller amount of sound data to be reproduced, or in an order of tracks having a smaller number of non-reproduced storage regions.

In another aspect of the invention, there is provided a waveform data processing apparatus comprising: a transfer section which reads out waveform data stored in a first storage device in data units, each data unit being made up of a predetermined number of samples, and which transfers the read waveform data to a second storage device to provide therein a waveform data storing range, the second storage device having an access speed higher than an access speed of the first storage device; a loop part determination section which determines a loop part, to be loop-produced, of the waveform data stored in the second storage device; an empty region determination section which determines whether or not there is an empty region having a size of not less than the data unit in the second storage device; a waveform data designation section which repeatedly designates waveform data to be transferred for the transfer section, in order to add waveform data to the second storage device adjacent to one of a leading point and a trailing point of the waveform data storing range, which is closer to the loop part in a period during which the determination result of the empty region determination section is affirmative; a release condition determination section which determines whether or not the number of samples from one of the leading point and the trailing point to a center of the loop part satisfies a predetermined block release condition during the course of a shift of the loop part; and a release section which releases a storage region storing the waveform data at one side of the leading point and the trailing point, which is farther from the loop part under conditions where the determination result of the empty region determination section is negative, and the determination result of the release condition determination section is affirmative.

Preferably, the waveform data designation section causes the transfer section to secure a number of samples more than a predetermined threshold value (th) of not less than the data unit from the center of the loop part, in accordance with the repeated designation of the waveform data, and the release condition determination section determines, as the block release condition, whether or not the number of samples from one of the leading and trailing points to the center of the loop part becomes less than the predetermined threshold value (th) during the course of the shift of the loop part. For example, when the total number of samples storable in the second storage device is n, the number of samples in the data unit is m, $\alpha$ is a constant having a range of $0.5 \leq \alpha \leq 1.0$, the predetermined threshold value (th) is expressed as follows:

$$th = n/2 - \alpha \cdot m.$$

Preferably, the release condition determination section determines, as the block release condition, whether or not the number of samples from one of the leading and trailing points to the center of the loop part becomes more than a predetermined threshold value (th) during the course of the shift of the loop part. For example, when the total number of samples storable in the second storage device is n, the number of samples in the data unit is m, $\alpha$ is a constant having a range of $0.5 \leq \alpha \leq 1.0$, the predetermined threshold value (th) is expressed as follows:

$$th = n/2 + \alpha \cdot m.$$

Preferably, the release condition determination section determines, as the block release condition, whether or not a difference between respective numbers of samples from the leading and trailing points to the center of the loop part becomes more than a predetermined threshold value (th) during the course of the shift of the loop part. For example, when the total number of samples storable in the second storage device is m, the number of samples in the data unit is m, $\alpha$ is a constant having a range of $1.0 \leq \alpha \leq 1.5$, the predetermined threshold value (th) is expressed as follows:

$$th = \alpha \cdot m.$$

Thus, in accordance with the one aspect of the present invention, pieces of waveform data respectively corresponding to track regions are transferred from the first storage device in an order of tracks having a smaller number of non-reproduced samples or in an order of tracks having a smaller unit of non-reproduced data. Accordingly, even when there is waveform data having a very short reproduction range in any one of the tracks, it is possible to rapidly supplement waveform data following the waveform data in question, and thus it is possible to reproduce waveform data without any problem.

In accordance with the configuration where reproduction is carried out using at least three storage regions, there is a time redundancy of at least two blocks for preparation to reproduction. Accordingly, even when one block cannot be prepared within a period from the beginning of the reproduction to the ending of the reproduction due to a short reproduction time of the block, there is no failure of the reproduction.

In accordance with the configuration where the reproduction order of a plurality of storage regions is predetermined, the preparation of the next block can be simply achieved by transferring sound data of one cluster to the reproduction-completed storage region, and setting a reproduction range.

In accordance with the configuration where sound or mute reproduction setting is carried out for a plurality of storage regions, respectively, when the reproduction time of a certain mute block is very short, there is no failure of the reproduction because the sound or mute reproduction setting for the next block is delayed.

In accordance with the configuration where the reproduction preparation for the next block is carried out in an order of tracks including non-reproduced storage regions having a smaller amount of sound data, to be reproduced, or in an order of tracks having a smaller number of non-reproduced storage regions, there is less possibility for failure of reproduction to occur because the preparation of the next block is carried out in an order of tracks having a higher failure possibility.

In accordance with the other aspect of the present invention, waveform data to be transferred to the transfer section is designated, in order to enable waveform data to be added adjacent to one side of the leading and trailing point of the waveform data storing range approaching the loop part. Accordingly, waveform can be stored at the forward and rearward sides of the loop part in a balanced state. As a result, it is possible to enhance the possibility of tracing the position of the loop part, even when the user greatly shift the position of the loop part.

In accordance with the configuration where it is determined, as the block release condition, whether or not the number of samples from one of the leading and trailing points to the center of the loop part is less than a predetermined threshold value, it is possible to prepare samples of a number not less than the predetermined threshold value at either the forward side or the rearward side.

In accordance with the configuration where it is determined, as the block release condition, whether or not the number of samples from one of the leading and trailing points to the center of the loop part is not less than a predetermined threshold value, it is possible to prevent an excessive number of samples from being prepared at one side, and thus it is possible to prevent the number of samples prepared at the other side from being insufficient.

In accordance with the configuration where it is determined, as the block release condition, whether or not a difference between respective numbers of samples from the leading and trailing points to the center of the loop part is not less than a predetermined threshold value, a block of the side having a larger number of prepared samples is released, to thereby enable preparation of a block at the other side. Accordingly, it is possible to prevent an excessive number of samples from being prepared at one side, and thus to prevent the number of samples prepared at the other side from being insufficient.

BRIEF DESCRIPTION OF THE DRAWINGS

FIGS. 2a and 2b are diagrams illustrating a memory map of a hard disk 30, and a data format of song management data.

FIG. 10 is a schematic view explaining operations in the nudge mode.

FIG. 12 is a flow chart of a transfer control processing. routine in the nudge mode.

DETAILED DESCRIPTION OF THE INVENTION

1. DATA FORMAT OF EMBODIMENT

Figure 1:
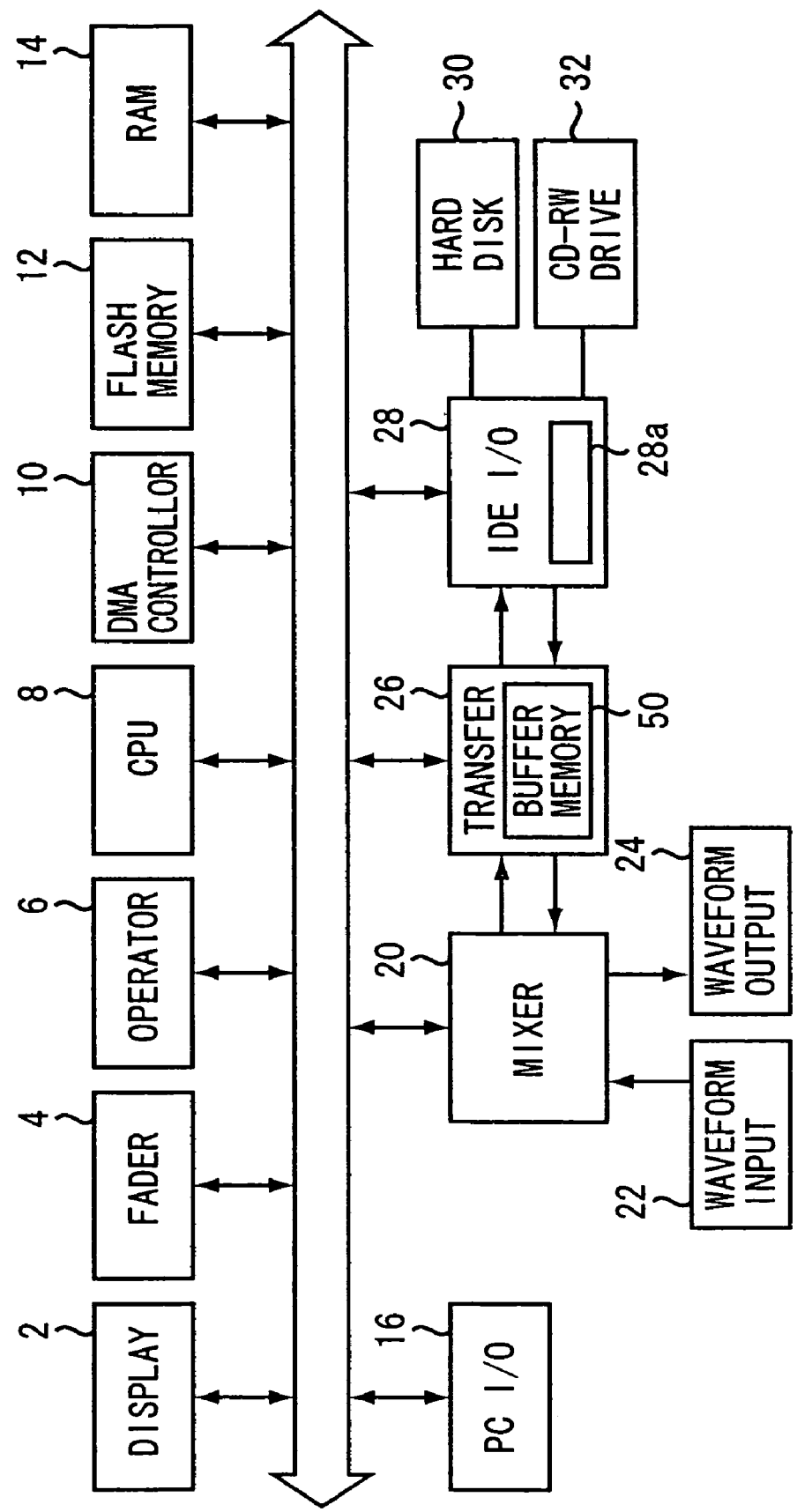
FIG. 1 is a block diagram of a waveform data processing apparatus according to an embodiment of the present invention.

Hereinafter, a hard disk recorder according to an exemplary embodiment of the present invention will be described. First, the format of song data adapted to this embodiment will be described with reference to FIGS. 2a and 2b.

FIG. 2a is a memory map applied to a hard disk which will be described hereinafter. In the drawing, the hard disk includes a system management data region 100 which stores various management data shared in the system, a sound data region 102 which stores substantial waveform data, and song management data regions 104, 106 . . . each of which stores song management data to designate an address of associated waveform data stored in the sound data region 102, and thus, to define the content of an associated music piece (song).

The song management data regions 104, 106 . . . are formed such that the number thereof corresponds to the number of stored music pieces. On the other hand, the sound data region 102 is shared for all songs. Accordingly, the waveform data shared for a plurality of songs can be commonly used without being repetitively stored. In the hard disk, waveform data is recorded cluster by cluster. In this embodiment, one cluster has a size of "128 K bytes. Accordingly, in the case of waveform data having a sampling period of "48 KHz" and a resolution of "16 bits", waveform data of about "1.5 sec" can be stored in one cluster.

The format of the song management data will now be described with reference to FIG. 2b. Each song management data includes track data 108-1 to 108-16 which define the content of up to 16 tracks. Each track data includes up to 8 virtual track data 110-1 to 110-8. Here, in each track data, one virtual track usable in recording or reproduction of the track data is actually designated. In other words, when recording or reproduction is carried out for a certain track, recording or reproduction is actually carried out for the designated virtual track.

In the case of a certain virtual track, there are, on the time axis of the virtual track, a section in which approximately continuous waveform data of music sound is present, and a section in which no music sound is substantially present. The former section is called a "region", whereas the latter section is called a "mute section". In this embodiment, accordingly, only for each region, data specifying the content of the region is recorded. In particular, all of the sections, in which no region is present, are determined to be mute sections, respectively. Each virtual track data is made up of one or a plurality of region data 112-1, 112-2 . . . which define the contents of regions, respectively. Each region data is made up of one or a plurality of node data 114-1, 114-2 . . . . Meanwhile, each region data defines various timings in the associated song. In this embodiment, each timing defined by each region data is indicated by a "sample point". Here, the "sample point" represents how many sampling periods have elapsed from the start timing of a song to the timing corresponding to the sample point.

Data of a song is indexed by one of the clusters in the sound data region 102. In accordance with linkage of node data, a series of clusters required to reproduce corresponding regions are specified. Each of the region data 112-1, 112-2 . . . also includes information about the leading one of the associated node data, an offset for the leading node data, a reproduction start timing of the region data, and a reproduction time for the region data. In the reproduction of region data, the waveform data of the cluster associated with the leading node data of the region data is first reproduced. The reproduction of the cluster is not carried out from the leading portion of the cluster, but is begun from a sample later than the leading portion of the cluster by the number of samples represented by the offset value. In FIG. 2b, the offset is indicated by an upward arrow pointing to the node data 114-1.

After the reproduction of the leading node data is completed, other pieces of node data linked to the leading node data are sequentially and continuously reproduced. Under the condition in which the linkage state of each node data, the reproduction start position (the leading node data, and the position specified by the offset for the leading node data), and the reproduction time are specified for one region, only a reproduction end position, at which the reproduction of the region is ended, is specified because clusters have a fixed storage capacity, and the contents of linked clusters are continuously reproduced during the reproduction of the region. Accordingly, the cluster linked to the trailing node data of the region may not always be reproduced up to the end portion thereof, and may be reproduced up to the sample corresponding to the reproduction end position. In FIG. 2b, the reproduction end position is indicated by a downward arrow pointing to the node data 114-3.

For simplicity of description, 16 virtual tracks designated by 16 tracks will be simply referred to as "tracks"

2. HARDWARE CONFIGURATION OF EMBODIMENT

2.1 Overall Configuration

Hereinafter, the configuration of the hard disk recorder according to the exemplary embodiment of the present invention will be described with reference to FIG. 1.

In FIG. 1, "2" designates a display which displays various information for the user. "4" designates a fader which sets recording and reproduction levels for individual track groups each consisting of a plurality of tracks. "6" designates an operator set which includes various operators such as a jog dial for setting recording and reproduction start timings, and recording and reproduction start buttons. "8" designates a CPU which controls elements of the hard disk recorder via a bus 16 using a program stored in a flash memory 12. "14" designates a RAM which is used as a work memory of the CPU 8.

"18" designates a PC interface which is connected to an external personal computer, to perform transmission and reception of waveform data or the like to or from the personal computer. "20" designates a mixer which performs mixing processing for audio signals of up to 16 reproduction channels or up to 8 recording channels in accordance with the set level of the fader 4. "22" designates a waveform input unit which supplies an externally-supplied digital audio signal to the mixer 20. "24" designates a waveform output unit which supplies an audio signal output from the mixer 20 to an external appliance. "28" designates an IDE interface which controls reading and writing operations of a hard disk 30, a CD-RW drive 32, or the like.

In the hard disk 30 and a CD-RW set in the CD-RW drive 32, the management data 100, sound data 102, song management data 104, 106 . . . , etc. are stored. In the IDE interface 28, a buffer memory 28a is provided which can store the content of at least one cluster of the hard disk 30. "26" designates a transfer controller which mediates waveform data between the mixer 20 and the IDE interface 28. A buffer memory 50 is provided in the transfer controller or circuit 26, to temporarily store waveform data. "10" designates a DMA controller which performs data communication among the elements of the hard disk recorder via the bus 16 in an empty period of the CPU 8.

2.2. Transfer Circuit 26

2.2.1. Circuit Configuration of Transfer Circuit 26

Figure 4:
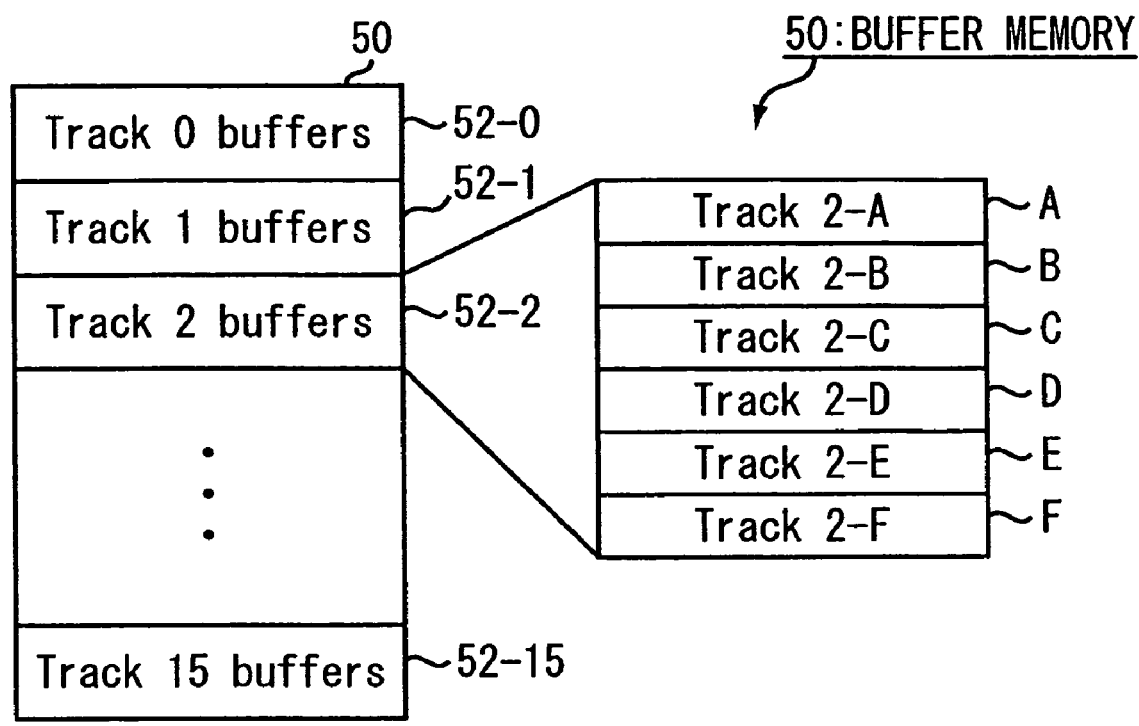
FIG. 4 is a memory map of a buffer memory 50 in a normal reproduction mode.

The memory map of a transfer buffer region provided in the buffer memory 50 of the transfer circuit 26 will be described hereinafter with reference to FIG. 4.

The transfer buffer region includes track regions 52-0 to 52-15 respectively corresponding to 16 tracks. Each track region includes buffer regions A to F. In principle, each buffer region has a memory capacity corresponding to one cluster of the hard disk 30. The buffer regions are allocated to sequential address regions in the buffer memory 50, respectively. Through the buffer regions, reading or writing operations are executed for the hard disk 30.

Figure 3:
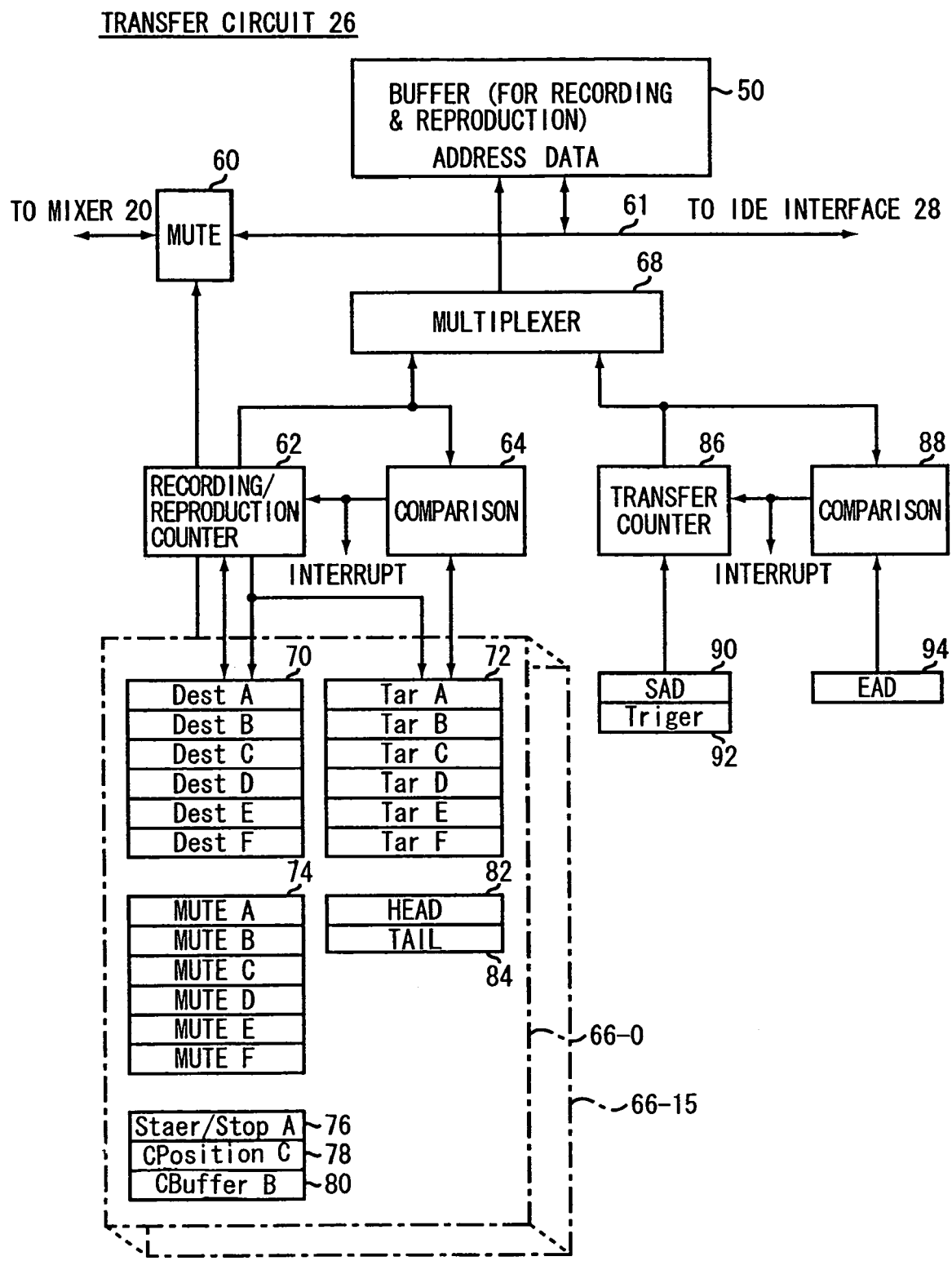
FIG. 3 is a block diagram of a transfer circuit 26.

Hereinafter, a detailed configuration of the transfer circuit 26 will be described with reference to FIG. 3. In the drawing, "60" designates a mute circuit which mutes (sets a level to "0") an audio signal supplied from the buffer memory 50 to the mixer 20 via a data bus 61, if necessary. "62" designates a recording/reproduction counter which generates a writing address when data supplied from the mixer 20 is to be written in the buffer memory 50 in a recording mode, and generates a reading address when a content of the buffer memory 50 is supplied to the mixer 20 in a reproduction mode. The hard disk recorder of this embodiment can reproduce one track while simultaneously recording another track. To this end, the recording/reproduction counter 62 generates writing and reading addresses for the tracks being recorded and reproduced, on a time-divisional basis. In this case, the writing and reading addresses of each track are incremented by "1" by the recording/reproduction counter 62 at intervals of the sampling period because the tracks have the same sampling period.

"66-0" to "66-15" designate track-corresponding register groups set by the CPU 8, respectively. In the track-corresponding register group 66-0, "70" designates start position registers in which start addresses Dest_A to Dest_F are set, respectively. Each of the start addresses Dest_A to Dest_F represents a sample point at which reproduction or recording of waveform data stored in the buffer memory is begun. "72" designates end position registers in which end addresses Tar_A to Tar_F are set, respectively. Each of the end addresses Tar_A to Tar_F represents a sample point at which reproduction or recording of waveform data stored in the buffer memory is ended. "74" designates mute registers in which mute flags MUTE_A to MUTE_F are set, respectively. Each of the mute flags MUTE_to MUTE_F represents whether or not the section from an corresponding one of the start addresses Dest_A to Dest_F to a corresponding one of the end addresses Tar_A to Tar_F (namely, a corresponding one of sections A to F) during reproduction of an associated track corresponds to a "mute section". Also, the registers, which store addresses Dest_X, Tar_X, and MUTE_X, respectively, for one of the buffer regions A to F, namely, a buffer region X, are collectively referred to as a "register set Reg_X". 6 register sets Reg_A to Reg_F are controlled under the condition in which they correspond to the 6 buffer regions A to F of each track, respectively. For example, although any addresses of the buffer memory may be set to the start addresses Dest_A to Dest_F and end addresses Tar_A to Tar_F, respectively, the 6 register sets Reg_A to Reg_F are set to correspond to respective buffer regions A to F in a normal reproduction mode as will be described hereinafter, such that the addresses of the corresponding buffer regions A to F are set to respective start addresses Dest_A to Dest_F and respective end addresses Tar_A to Tar_F. In this regard, in the description of the normal reproduction mode, the control associated with the track-corresponding registers may be referred to as the control associated with the corresponding buffer region.

The relation between each of the buffer regions A to F and the mute section will be described hereinafter. As described above, a section of each virtual track other than the section constituting a "region" is called a "mute section". In the sound data region 102, there is no waveform data corresponding to such a mute section. In this embodiment, however, one buffer region is also allocated to a mute section generated between regions when desired waveform data is transferred to the buffer regions A to F, for every number of samples corresponding to one cluster. A reading operation is carried out for the mute section while sequentially allocating buffer regions to the mute section until the mute section is ended. In this case, mute flags MUTE_A to MUTE_F are set for respective buffer regions. In the case of a buffer region corresponding to a mute section, the mute flag of the buffer region is set to "1". On the other hand, in the case of a buffer region, which does not correspond to a mute section, the mute flag of the buffer region is set to "0". Thus, in this embodiment, the track-corresponding registers are controlled in waveform data units each having a size not larger than one cluster, for either "regions" or "mute sections". In the specification, the waveform data unit is referred to as a "block". The time axis of a virtual track, in which the above-described regions and mute sections are present, may be considered as a sequence of a plurality of sound blocks and a plurality of mute blocks.

In the recording/reproduction counter 62, the mute registers 74 are sequentially referred to, in order to sequentially determine, for the addresses read in a reproduction operation, whether or not each of the addresses is associated with a buffer region corresponding to a mute section. When it is determined that the currently read address is associated with a mute section, a command is output to the mute circuit 60, to cause the mute circuit 60 to mute an associated audio signal. As a result, in the mute section, the level of the audio signal output to the mixer 20 is always "0". When audio signals are muted by the mute flags MUTE_A to MUTE_F, as described above, there is no problem caused by the contents of a buffer region corresponding to a mute section. Accordingly, it is unnecessary, for example, to fill the buffer regions each corresponding to a mute section with "0". Thus, it is possible to rapidly perform processes associated with mute sections.

"76" designates a start/stop register which designates whether or not a recording/reproduction operation is executed for an associated one of the tracks. The start/stop register 76 stores a start/stop flag therein. When the start/stop flag is "1", it represents a recording/reproduction state. On the other hand, when the start/stop flag is "0", it represents a stop state. "80" designates a current buffer register. The current buffer register 80 stores a current region designation value CBuffer designating a "current region" which is one of the buffer regions A to F, and in which the current point CP is positioned. That is, the current region designation value CBuffer is set to one of numerical values of 1 to 6 respectively corresponding to the buffer regions A to F. For regions other than the buffer regions A to F and current region, the current region designation value CBuffer is "0".

Here, the current point CP is a sample point which is a reference for start of recording, reproduction or the like. The current point CP is designated by the JOG dial or the like included in the operator set 6. The current point CP has a value common in all tracks. However, the practical storage position of the sample corresponding to the current point CP in each track, which is one of the buffer regions A to F, is different from those of the remaining tracks. Accordingly, the buffer region, in which the sample corresponding to the current point CP is stored, is stored as independent current region designation values CBuffer for respective tracks. "78" designates a current point register. The current point register 78 stores a current point address CPosition, namely, an address at which the sample corresponding to the current point CP is stored in the current region.

The default order of using the buffer regions A to F (register sets Reg_A to Reg_F) in recording/reproduction operations is an alphabetical order. Provided, under the condition in which one (register set) of the buffer regions is designated as "HEAD", and another one (register set) of the buffer regions is designated as "TAIL", recording/reproduction of the region designated by "HEAD" is begun after completion of the recording/reproduction of the region designated by "TAIL". For example, under the condition in which the buffer region A is designated by a HEAD region, and the buffer region F is designated by a TAIL region, the buffer regions A to F can be circularly used. "82" designates a HEAD region designation register which designates one of the buffer regions A to F as a HEAD region, if necessary. "84" designates a TAIL region designation register which designates one of the buffer regions A to F as a TAIL region, if necessary. Each of the registers 82 and 84 designates one of the buffer regions A to F by a corresponding one of the numerical values of 1 to 6. When neither the HEAD region nor the TAIL region is designated, the contents of both registers 82 and 84 are "0".

"64" designates a comparator which compares the reading address counted by the recording/reproduction counter 62 with the end address Tar_X ("X" is one of the buffer regions A to F) stored in the end position register 72. When the comparator 64 detects that the reading address is identical to the end address Tar_X, it informs the recording/reproduction counter 62 of the fact. As a result, the recording/reproduction counter 62 corrects the reading address to be identical to the start address Dest_Y ("Y" represents a region which is one of the buffer regions A to F, and will be used following the buffer region X). Thereafter, the counting-up of the reading address is continued. Also, the comparator 64 generates an interrupt signal called a "reproduction ending interrupt", for the CPU 8, when it detects that the reading address is identical to the end address Tar_X.

"86" designates a transfer counter which generates a reading address required when data is transferred from the buffer memory 50 to the IDE interface 28 in a recording operation, and a writing address required when data is transferred from the IDE interface 28 to the buffer memory 50 in a reproduction operation. Hereinafter, each of the addresses is referred to as a "transfer address". "90" designates a start address register which stores an initial value of the transfer address, namely, a start address SAD. "92" designates a trigger register. When "1" is written in the trigger register 92 by the CPU 8, data transfer is begun between the hard disk 30 and the CD-RW drive 32. The transfer address of the buffer memory 50 is counted up by the transfer counter 86 every time an amount of data corresponding to one address is transferred. "94" designates an end address register which stores a final value of the transfer address, namely, an end address EAD. "88" designates a comparator which compares the current value of the transfer address with the end address EAD. When the compared values are identical, the comparator 88 stops the operation of the transfer counter 86, and clears the trigger register 92 to "0".

Also, the comparator 88 generates an interrupt signal called a "transfer ending interrupt", for the CUP 8, when it detects that the transfer address is identical to a final value thereof. The hard disk 30 designates one of the multiple clusters by a corresponding cluster NO, and performs an access (data reading or data writing) to the designated cluster. That is, the hard disk 30 cannot perform a parallel access to a plurality of clusters. For this reason, for the circuits (86 to 94) for performing data transfer from or to the IDE interface 28, only one set is provided. "68" designates a multiplexer which adjusts the writing/reading address output from the recording/reproduction counter 62 and the transfer address output from the transfer counter 86. Since the recording/reproduction counter 62 should synchronize with the mixer 20, it is necessary to execute the counting-up operation of the recording/reproduction counter 62 for every sampling period. Meanwhile, it is unnecessary to synchronize the operation of the transfer counter 86 with, in particular, the mixer 20. Accordingly, the access to the buffer memory 50 by the recording/reproduction counter 62 is preferential, and the access to the buffer memory 50 by the transfer counter 86 is executed in an empty time. Thus, data inputting to and data outputting from the IDE interface 28, and data inputting to and data outputting from the mixer 20 are executed in a parallel manner on a time-divisional multiplexing basis.

2.2.2. Example to Set Track-Corresponding Register Groups

Figure 5A:
FIGS. 5a through 5e are a schematic view explaining operations in the normal reproduction mode.
Figure 5B:
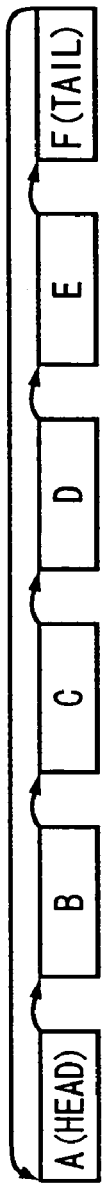

Hereinafter, an example of using various registers in the track-corresponding register group 66-0 will be described with reference to FIG. 5. When both a HEAD region designating register 82 and a TAIL region designating register 84 are set to "0" (non-designation of region), each of the buffer regions A to F is used "once" for recording and reproduction thereof in an alphabetical order, as shown in FIG. 5a. On the other hand, when the buffer region F is designated as a TAIL region, and the buffer region A is designated as a HEAD region, as shown in FIG. 5b, the buffer region A is used again after the use of the buffer region F is completed. That is, the buffer regions A to F are repeatedly circularly used.

Figure 5C:
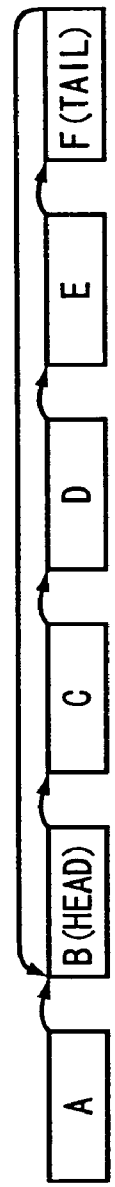
Figure 5D:

When the buffer region B is designated as a HEAD region, and the buffer region F is designated as a TAIL region, as shown in FIG. 5c, the buffer region A is first used once, and the buffer regions B to F are then repeatedly used. On the other hand, when the buffer region B is designated as a HEAD region, and the buffer region E is designated as a TAIL region, as shown in FIG. 5d, the buffer region A is first used once, and the buffer regions B to E are then repeatedly used.

Of the above-described use examples, the use example of FIG. 5b is most general. In this case, it is possible to buffer transfer of waveform data between the hard disk 30 and the mixer 20 for reproduction or recording of the waveform data while most effectively using the overall memory capacity of the buffer regions A to F. Meanwhile, the use example of FIG. 5c is convenient in outputting and reproduction of sound effects. That is, the contents of leading portions of multiple waveform data having a possibility of outputting sound effects are transferred to a region in the buffer memory 50 other than the regions designated as the buffer regions A to F of each track. Thereafter, when a reproduction instruction is received in association with one piece of the waveform data, the start address and end address of the leading portion of the waveform data piece are set to a start address Dest_A and an end address Tar_A in one of the track-corresponding registers. In this case, accordingly, it is possible to start reproduction of the waveform data piece in response to the reproduction instruction without any delay. Subsequently, reproduction of the waveform data of the hard disk 30 following the leading portion can be carried out using the buffer regions B to F as transfer buffers.

Figure 5E:
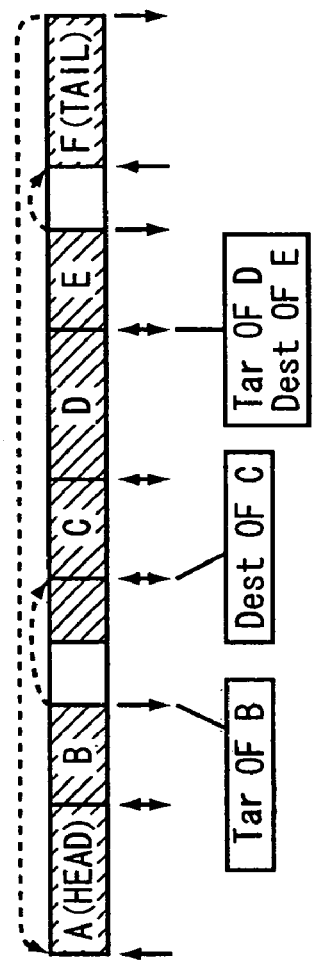

Next, an example of setting start addresses Dest_A to Dest_F and end addresses Tar_A to Tar_F will be described with reference to FIG. 5e. In FIG. 5e, areas of the buffer regions A to F, the waveform data of which must be reproduced (reproduction areas), are indicated by oblique lines. Areas of the buffer regions A to F other than the reproduction areas are referred to as "non-reproduction areas". Since the reproduction area of the buffer region A corresponds to the overall area of the buffer region A, the start address Dest_A is set to the leading address of the buffer region A, and the end address Tar_A is set to the trailing address of the buffer region A. Also, the buffer region B has a reproduction area ranging from the leading portion of the buffer region B to an intermediate portion of the buffer region B. Accordingly, the start address Dest_B is set to the leading address of the buffer region B, and the end address Tar_B is set to an intermediate address of the buffer region B.

On the other hand, the buffer region C has a reproduction area ranging from an intermediate portion of the buffer region C to the trailing portion of the buffer region C. Accordingly, the start address Dest_C is set to an intermediate address of the buffer region C, and the end address Tar_C is set to the trailing address of the buffer region C. The reproduction areas of the buffer regions D and F are identical to that of the buffer region A, and the reproduction area of the buffer region E is identical to that of the buffer region B. Accordingly, the start addresses Dest_D to Dest_F and end addresses Tar_D and Tar_F are set in the same manners as those of the buffer regions A and B, respectively.

It is assumed that the buffer region A is designated in association with a current region designation value CBuffer, the start address Dest_A is designated as a current point address Cposition, and the flag of the start/stop register 76 is set to "1". In this case, the recording/reproduction counter 62 starts a count-up operation for a reading address, using the current point address Cposition (=Dest_A) as an initial value. As a result, the contents of the buffer region A are sequentially read from the start address Dest_A to the end address Tar_A, and the read contents are supplied to the mixer 20. When the reading address corresponds to the end address Tar_A, this fact is informed to the recording/reproduction counter 62. In this case, the recording/reproduction counter 62 sets the reading address to the start address Dest_B of the buffer region B to be subsequently read.

In this embodiment, the start address Dest_B of the buffer region B is an address just following the end address Tar_A of the buffer region A because sequential addresses are allocated to the buffer regions A to F. Accordingly, when the reading address transits from the buffer region A to the buffer region B, the reading address has an incremented value identical to that of the reading address when the reading address is simply incremented by "1" for every sampling period. After the reading address is subsequently rendered to correspond to the end address Tar_B, the reading address transits to the start address Dest_C in the next sampling period. Thus, it can be seen that the reading operation jumps the non-reproduction areas of the buffer regions B and C such that only the reproduction areas of the buffer regions B and C are reproduced.

Similarly, in the case of the buffer regions D to F, only the reproduction areas thereof are subsequently reproduced. Also, in a sampling period next to a sampling period in which the reading address reaches the end address Tar_F of the buffer region F under the condition in which the buffer region F is set as a tail region, and the buffer region A is set as a head region, as in the illustrated case, the reading address is set again to the start address Dest_A. In this case, however, the contents of the buffer region A are updated after the initial read of the buffer region A, but before the next read of the buffer region A, in accordance with waveform data to be subsequently reproduced. For this reason, the start address Dest_A and end address Tar_A are set to values according to the new waveform data, respectively. As a result, it may be natural that the start address Dest_A is different from the illustrated state (the leading portion of the buffer region A).

Figure 6:
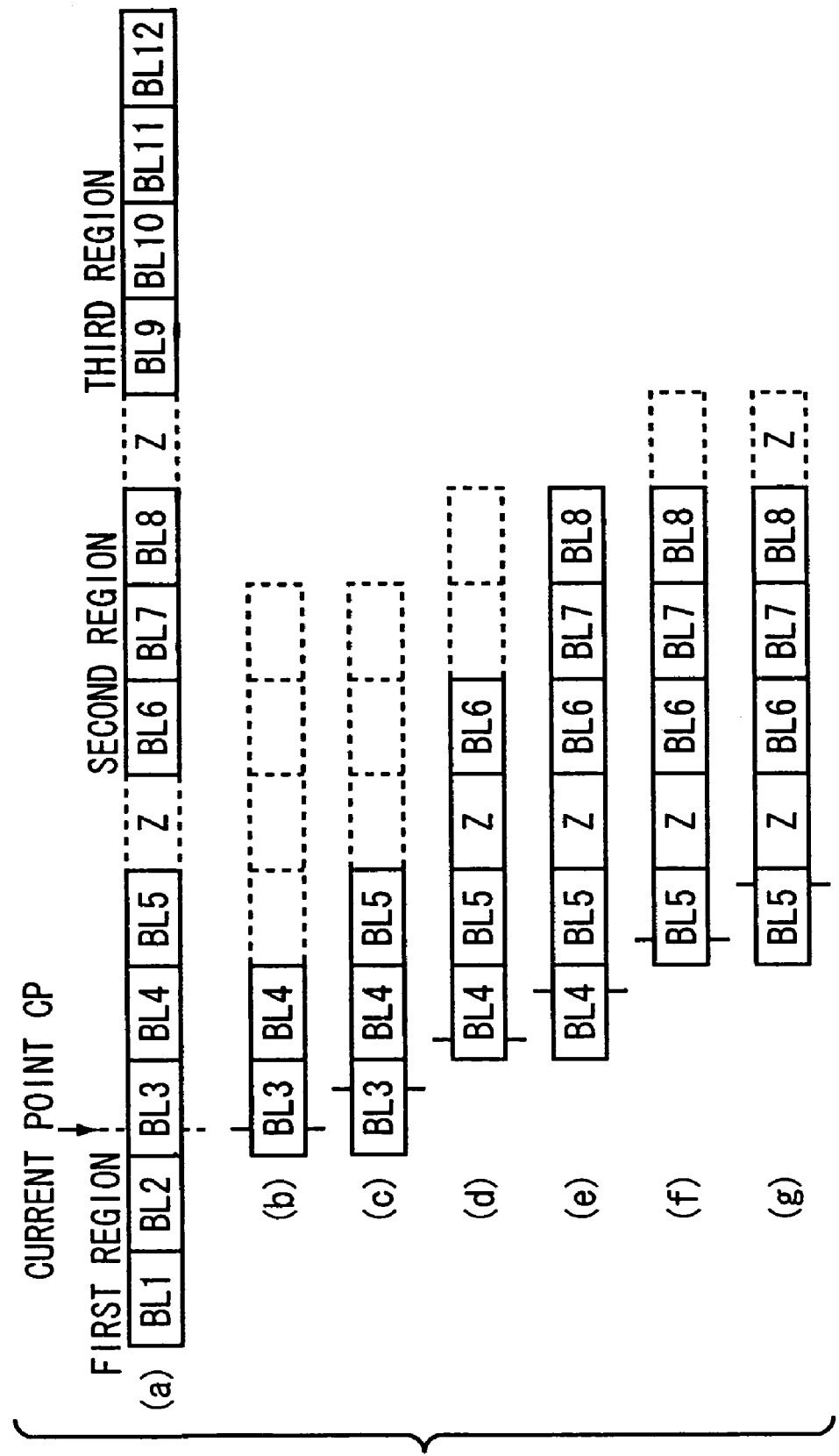
FIG. 6 is a schematic view explaining operations in the normal reproduction mode.

3. OPERATIONS OF EMBODIMENT 3.1 Normal Reproduction Mode 3.1.1. Summary of Operations Hereinafter, operations of this embodiment will be summarized. The hard disk recorder of this embodiment has operation modes, namely, a "normal reproduction mode" and a "nudge mode". First, operations in the normal reproduction mode will be summarized with reference to FIG. 6. FIG. 6a is a diagram illustrating the format of one virtual track. The virtual track includes first through third regions.

The waveform data associated with the first region is made up of blocks BL1 to BL5. The waveform data associated with the first region is made up of blocks BL6 to BL8. The waveform data associated with the third region is made up of blocks BL9 to BL12. Each block in each region represents waveform data stored in one cluster. Since the content of each cluster may not be always completely reproduced, the data amount of each block may depend on the associated cluster.

Also, since there may be a "block" (mute block) in a mute section in accordance with this embodiment, blocks of mute sections will be described hereinafter. First, it is assumed that the maximum number of samples of waveform data storable in one cluster is referred to as a "cluster capacity Scr", and the length (number of samples) of one mute section is referred to as "Smt". When the length of a mute section, Smt, is divided by the cluster capacity Scr, a quotient and a remainder are obtained. The value obtained by adding "1" to the quotient is the number of mute blocks allocated to the mute section. In other words, as the current point CP of a music piece is shifted, mute blocks associated with mute sections are circularly allocated to the buffer regions A to F.

The length of each mute block is fixed to the cluster capacity Scr, except for the last block. That is, when such a mute block is allocated to a buffer region X, the start address Dest_X and end address Tar_X are always set to the leading and trailing addresses of the buffer region X, respectively. Meanwhile, the length of the last block is equal to the remainder of "Smt/Scr". In other words, when the last block is allocated to the buffer region X, the start address Dest_X is set to the leading address of the buffer region X, and the end address Tar_X is set to a value according to the number of samples in the remainder.

Although it may be thought that it is basically unnecessary to define blocks for mute sections because no music sound signal is generated in any mute section, blocks are allocated, as buffer regions A to F, to mute sections in accordance with the numbers of samples in the associated mute sections, similarly to regions, in order to unify the contents of control for the recording/reproduction counter 62 irrespective of whether the block corresponding to the current point CP is associated with a region or a mute section. Also, the start addresses Dest_A to Dest_F and end addresses Tar_A to Tar_F are set.

It is assumed that the current point CP is set at a certain timing in the associated song in accordance with a user's operation. In the example of FIG. 6a, the current point CP is positioned in the block BL3 of the first region. In this case, the content of the block BL3 is first written in one buffer region (for example, the buffer region A). Subsequently, the block BL4 next to the block BL3 is written in the next buffer region (similarly, the buffer region B) (FIG. 6b). Before the two leading blocks have been written, it is impossible to start the reproduction of the associated virtual track. For this reason, a request to access the hard disk 30 for writing of the leading blocks is preferentially executed.

If there is no separate request to access the hard disk 30, to be more preferentially executed, the next block BL5 is written. The preferential control will be described later in detail. When the JOG dial is continuously operated by the user within the above-described period, the current point CP is slightly shifted (FIG. 6C). In this case, the block BL5 is the trailing block of the first region, and a mute section is present between the first region and the second region. Accordingly, the block next to the block BL5 is a mute block. To this block, a next region is allocated, as shown in FIG. 6d. Since the operation of the JOG dial is continued in this case, it is also assumed that the current point CP is shifted to the block BL4. In this case, the buffer region, in which the block BL3 has been stored, is released. That is, this buffer region is empty.

FIG. 6e illustrates a state in which subsequent blocks BL7 and BL8 are written in empty buffer regions, respectively. In this case, the number of empty buffers in the associated track is "0". When the current point CP is further shifted to the block BL5, the region, in which the block BL4 has been stored, is released (FIG. 6f). Since the block BL8 is the end block of the second region, and a mute section is present between the second region and the third region, the block next to the block BL8 is a mute block (FIG. 6g).

Thus, as the current point CP is shifted in accordance with an operation of the JOG dial operated by the user, pieces of the waveform data of a plurality of blocks, the leading one of which is a block including the current point CP (current block), are sequentially written in the buffer regions A to F in accordance with the priorities of the waveform data pieces. When the start button is depressed under the condition in which the current point CP is set to be positioned at a desired position, reproduction of the associated song is begun from the position corresponding to the current point CP. After the start of the reproduction of the song, the current point CP is incremented by "1" for every sampling period, and the sample point corresponding to the incremented current point CP is read. The read sample point is outputted as a music sound signal. The contents of the buffer regions are updated following the shift of the current point CP. The updating operation is carried out in the same manner as the update of the current point CP according to an operation of the JOG dial.

3.1.2. Processing of Current Point Designation Event

Operations carried out when various events occur in the normal reproduction mode will be described hereinafter.

Figure 7A:
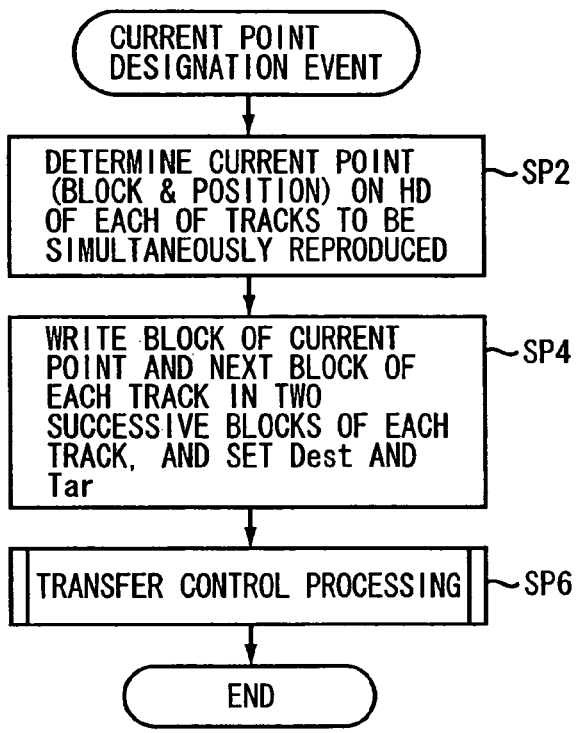
FIGS. 7a through 7d are flow charts of a routine for processing a variety of events in the normal reproduction mode.

First, when the user operates the JOG dial included in the reproduction mode operator set 6, the current CP is shifted in accordance with the difference between the operating amounts of the JOG dial before and after the operation. The user may designate the current point CP (absolute time point) using a ten button key pad or the like. When such an event occurs, a current point designation event routine shown in FIG. 7a is begun. When the routine proceeds to step SP2 in FIG. 7a, the cluster NO. of a cluster, which stores waveform data of a block corresponding to the current point CP, in each of the tracks to be simultaneously reproduced, the start address and end address of the block, and the address corresponding to the current point CP are determined, based on song management data.

When the routine subsequently proceeds to step SP4, a transfer process is begun to transfer clusters respectively containing waveform data corresponding to the block, in which the current point CP of each track is positioned, and waveform data corresponding to the next block to two successive ones of the buffer regions A to F associated with the track, based on the cluster NOs. of the clusters. The start addresses Dest_X and end addresses Tar_X of the two regions are then stored in the start position registers 70 and end position registers 72, respectively. Also, the mute flag MUTE_X is set to "0" (setting for reproduction of sound). However, when the block, in which the current point CP is positioned, or the next block is a mute block, the start address Dest_X and end address Tar_X of the mute block are set based on the size of the mute block, and the mute flag MUTE_X is set to "1". In this case, no waveform data is separately written (setting for reproduction of mute).

At step SP4, a value referred to as "the number of empty buffers RB" is also set. The number of empty buffers RB is the number of buffer regions permitting transfer of new waveform data from the hard disk 30 thereto without any problem. For example, where a head region and a tail region are set for one track, as shown in FIG. 5b, the number of usable buffer regions is totally "6". In this case, however, the empty buffer number RB is "4" because waveform data was transferred, at step SP4, to two of the buffer regions for which setting for reproduction of sound or reproduction of mute has, in turn, been executed.

When the routine subsequently proceeds to step SP6, a transfer control processing routine (FIG. 8), which will be described later, is called. Although the processing contents of this routine will be described hereinafter, blocks are sequentially allocated to the empty ones of the buffer regions A to F in each track. If necessary, pieces of waveform data from the hard disk 30 are also sequentially transferred to the empty buffer regions.

3.1.3. Processing of Reproduction Start Instruction Event

Figure 7B:
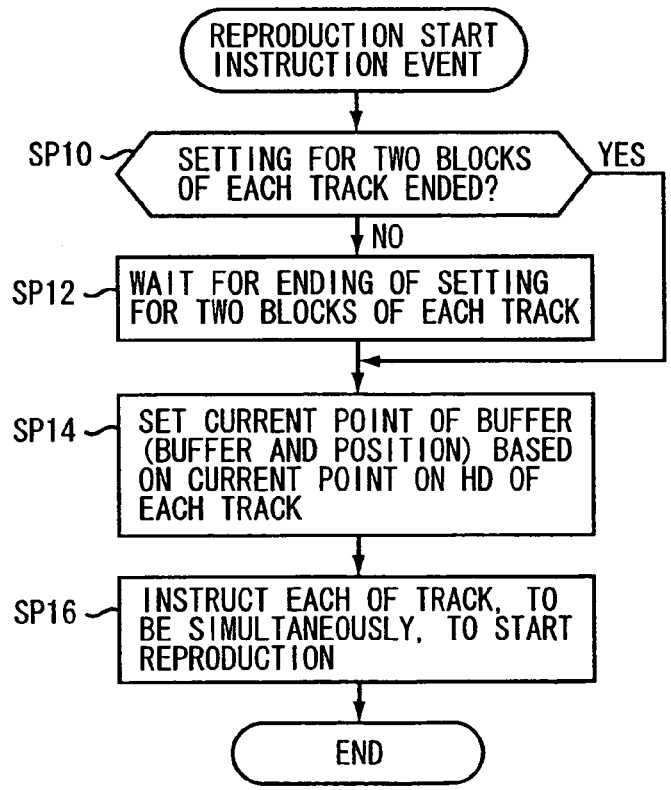

When the user operates the start button in the operator set 6 after the designation of the current point CP, a reproduction starting event processing routine as shown in FIG. 7b is begun. When the routine proceeds to step SP10 in the drawing, it is determined whether or not the waveform data of two blocks, namely, the current and next blocks, in each of the tracks to be simultaneously reproduced, has been completely set. Here, "completely set" means that setting for reproduction of sound has been performed for a block in question, which is within a region, in accordance with actual writing of waveform data transferred from the hard disk in the block based on song management data, or setting for reproduction of mute has been performed for one buffer region X based on song management data in association with a block in question which is within a mute section. When a determination of "NO" is made, the routine then proceeds to step SP12. In this case, the routine is in a standby state until the waveform data of at least two blocks for each track is set.

Since this routine is begun after the start-up of the current point designation event routine (FIG. 7a), waveform data are always set in at least two buffer regions for each track by the above-described step SP4. However, since transfer processing is "begun" at step SP4, there may be an occasion in which the waveform data has not yet been set, for example, when the start button is depressed just after the designation of the current point CP. For this reason, the routine is in a standby state until the waveform data is completely set.

When the routine subsequently proceeds to step SP14, a current region designation value Cbuffer and a current point address Cposition are set in the current buffer register 80 and current point register 78, based on addresses respectively corresponding to the buffer region, for which the current cluster of each track has been set, and the current point CP in the current cluster, respectively. When the routine then proceeds to step SP16, reproduction instructions are made for the tracks to be simultaneously reproduced. That is, "1" is written in the start/stop register 76 for each track in question. Simultaneously, the recording/reproduction counter 62 starts a counting operation. As a result, the contents of the buffer regions A to F of each track are subsequently read. Thus, waveform data is supplied to the mixer 20 via the mute circuit 60.

3.1.4. Processing of Reproduction Ending Interrupt

Figure 7C:
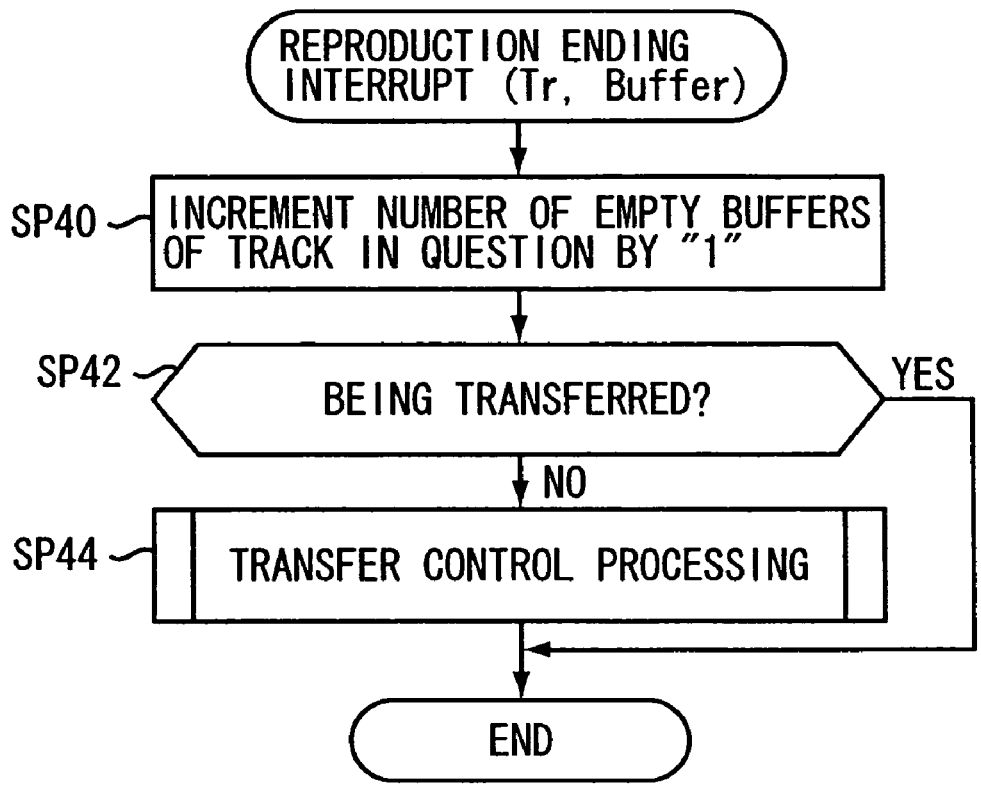

When reproduction of waveform data is begun, the contents of the buffer regions A to F of each of the tracks are read. If the reading address of one buffer region X in one of the tracks is identical to the end address Tar_X of the buffer region X, a reproduction ending interrupt is generated for the CPU 8. In this case, accordingly, a reproduction ending interrupt processing routine as shown in FIG. 7c is begun. When the routine proceeds to step SP40 in the drawing, the empty buffer number RP of the associated track is incremented by "1". Subsequently, the routine proceeds to step SP42 at which it is determined whether or not data is being transferred, for reading or writing thereof, between the IDE interface 28 and the buffer memory 50. When a determination of "YES" is made in this case, this routine is immediately ended. Meanwhile, when a determination of "NO" (not in a transfer state) is made, a transfer control processing routine (FIG. 8), which will be described later, is called, so that waveform data is transferred for the buffer regions A to F, if necessary.

3.1.5. Processing of Transfer Control

Figure 8:
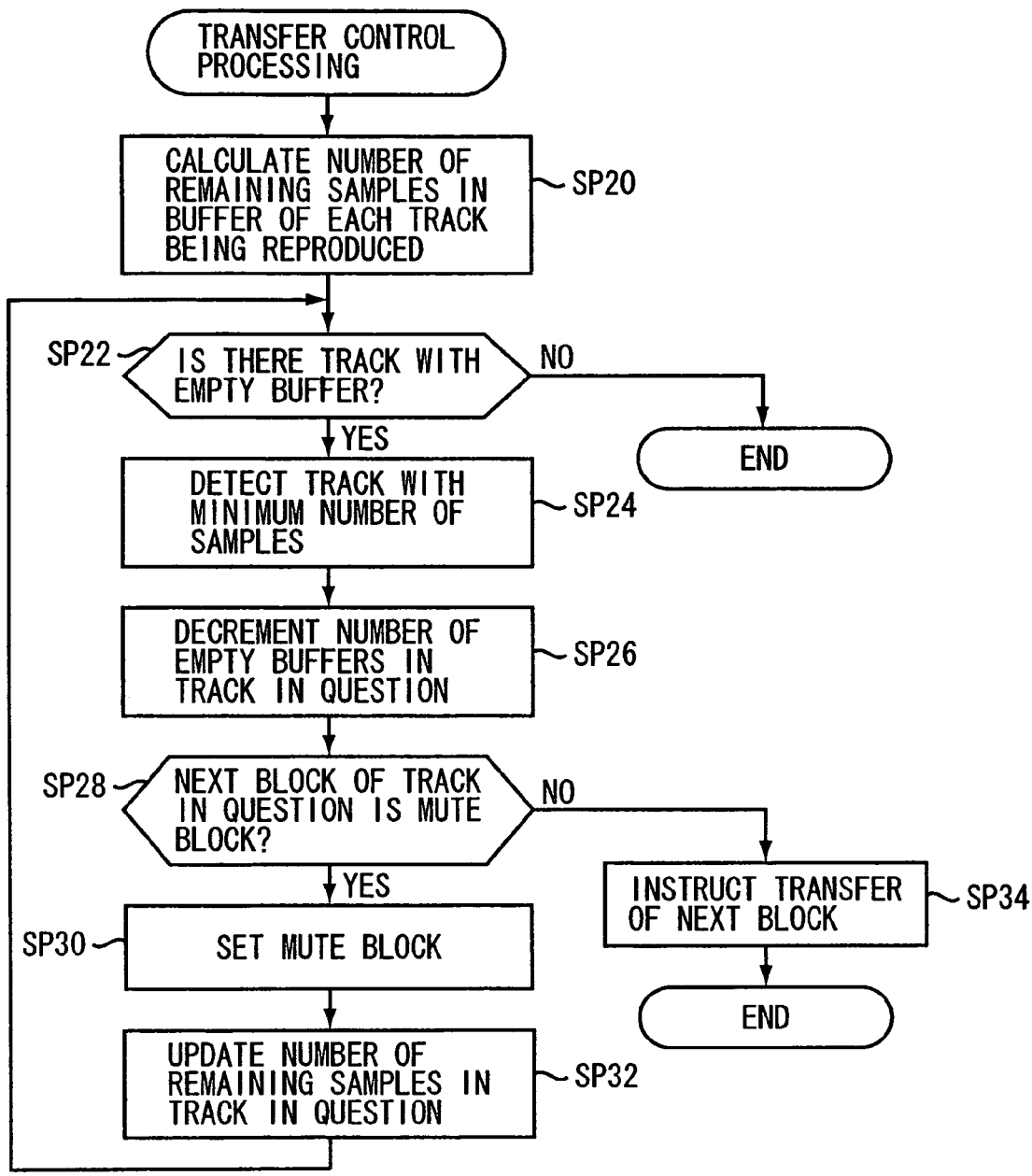
FIG. 8 is a flow chart of a transfer control processing routine in the normal reproduction mode.

Hereinafter, a process executed by the transfer control processing routine called at step SP6 or SP44 will be described with reference to FIG. 8.

When the routine proceeds to step SP20 in the drawing, the number of remaining samples, namely, the number of non-reproduced ones of the samples of the waveform data in each block for which reproduction setting has been completed, is calculated for each track which is being reproduced by the transfer circuit 26.

When the routine subsequently proceeds to step SP22, it is determined whether or not there is a track having an empty buffer number RB of not less than "1", namely, whether or not there is a block to be prepared for a reproduction thereof. When a determination of "NO" is made in this case, this routine is immediately ended because there is no buffer region capable of transferring waveform data. On the other hand, when a determination of "YES" is made at step SP22, the routine proceeds to step SP24. At step SP24, a particular one of the tracks having an empty buffer number RB of not less than "1", which has a minimum number of remaining samples, (the track to be processed for a transfer operation), is detected. That is, a request to prepare a block is preferentially made for the track having a smaller number of remaining samples. Where there are a plurality of tracks to be processed for preparation of a next block, in the hard disk 30, the track having a smaller number of remaining samples than those of the remaining tracks is preferentially processed, and an access to the hard disk 30 is carried out for the track.

When the routine then proceeds to step SP26, the empty buffer number RB of the track to be processed for a transfer operation is decremented by "1". When the routine subsequently proceeds to step SP28, the song management data is referred to, in order to determine whether or not the next block in the track to be processed for a transfer operation (the block next to the last one of the blocks for which reproduction setting has been completed) is a mute block. When a determination of "YES" is made in this case, the routine proceeds to step SP30. At step SP30, the mute flag MUTE_X associated with the next buffer region X is set to "1", and the start address Dest_X and end address Tar_X are set in accordance with the length of the associated block. When the routine then proceeds to step SP32, the number of remaining samples in the track in question is updated. That is, the length of the newly added block is added to the number of remaining samples.

The mute block setting process at steps SP30 and SP32 is immediately ended because it is not related to operation of the hard disk 30. In this case, accordingly, the routine returns to step SP22, to execute the processes following step SP22. When setting of a block other than a mute block is required, namely, when a determination of "NO" is made at step SP28, the routine proceeds to step SP34. In this case, the cluster NO of the cluster containing the waveform data of the next block is determined. For transfer of the cluster, instructions are also sent to the transfer circuit 26 and IDE interface 28.

In detail, the number of the cluster to be transferred is informed to the IDE interface 28. The leading address of the buffer region X of a transfer destination is stored, as a start address SAD, in the start address register 90. Also, the trailing address of the buffer region X is stored, as an end address EAD, in the end address register 94. "1" is then written in the trigger register 92. Instructions to start a reading operation are sent to the IDE interface. In addition, the start address Dest_X and end address Tar_X are set for the cluster transferred to the buffer region X in accordance with a portion of the cluster actually constituting a block, based on the song management data. Following these steps, all processes in the routine are ended.

After completion of this routine, queue (standby for head seek and disk rotation) of the designated cluster is carried out in the IDE interface 28. Accordingly, a reading operation is begun for the content of the cluster. Pieces of data sequentially read in the reading operation are stored in the buffer memory 28a of the IDE interface 28. A signal representing the results of this operation is transmitted from the IDE interface 28 to the transfer circuit 26. In response to this signal, the transfer circuit 26 sequentially receives data read from the buffer memory 28a in data units each corresponding to one address, writes the received data in the buffer memory 50 at a transfer address determined by the transfer counter 86, and causes the transfer counter 86 to count up the transfer address by "1". Thus, the waveform data of the cluster is transferred from the hard disk 30 to the buffer region X via the IDE interface 28.

3.1.6. Processing of Transfer Ending Interrupt

Figure 7D:
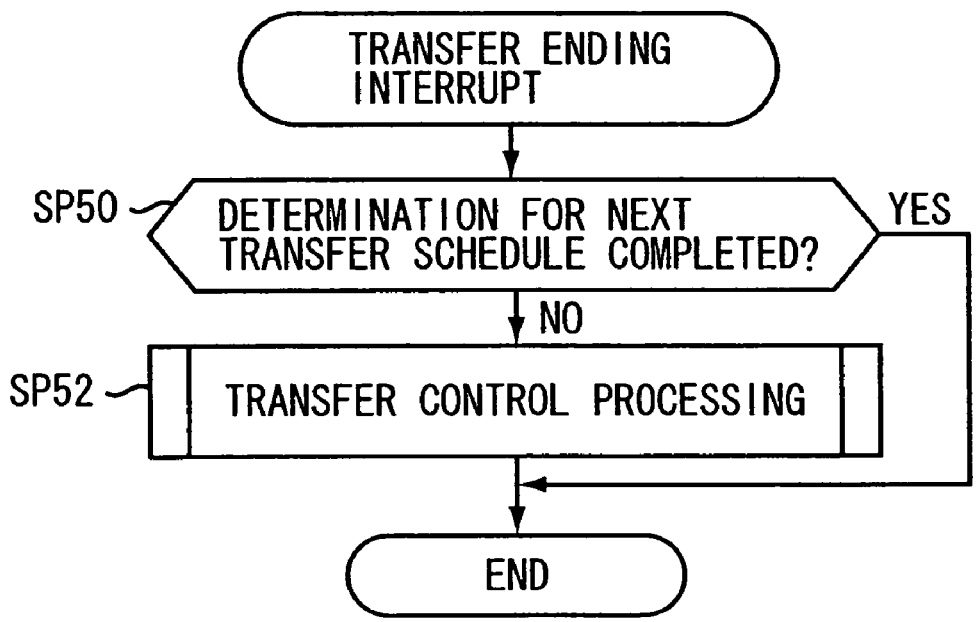

In the case of data transfer started at step SP34 of the transfer control processing routine (FIG. 8) or at step SP4 of the current point designation event routine (FIG. 7a), the data of one cluster of the hard disk 30 is gradually read to the buffer memory 28a by the IDE interface 28, and is gradually transferred from the buffer memory 28a to the buffer memory 50 by the transfer circuit 26. During these operations, operation of counting up the transfer address is executed. However, when the transfer address corresponds to the end address EAD stored in the end address register 94, an interrupt referred to as a "transfer ending interrupt" is generated from the CPU 8. As a result, a transfer ending interrupt routine shown in FIG. 7d is begun.

When the routine proceeds to step SP 50 in the drawing, it is determined whether or not the cluster to be subsequently transferred has been determined. That is, when step SP4 is first executed, the process for transferring waveform data of two blocks for each track is begun. Accordingly, where the blocks are those of a region, it is determined at step SP4 that the corresponding clusters should be transferred. Therefore, although a transfer ending interrupt is generated before the clusters are completely transferred, a determination of "YES" is made at step SP50, and this routine is immediately ended. On the other hand, when a determination of "NO" is made at step SP50, the routine proceeds to step SP52. At step SP52, the above-described transfer control processing routine (FIG. 8) is called. Next waveform data is transferred for a track in which an empty buffer region is present, and the number of remaining samples is minimum. Otherwise, mute blocks are set. Thus, the access to the hard disk 30 (transfer of clusters) to be executed after the setting of the current point CP in association with the preparation of the current block and next block of each track is preferentially executed, as compared to the access to the hard disk 30 (transfer of clusters) to be executed in association with the transfer control processing of FIG. 8.

3.2. Nudge Mode 3.2.1. Summary of Operations

Hereinafter, operations of this embodiment in a nudge mode will be described with reference to FIG. 9.

Figure 9A:
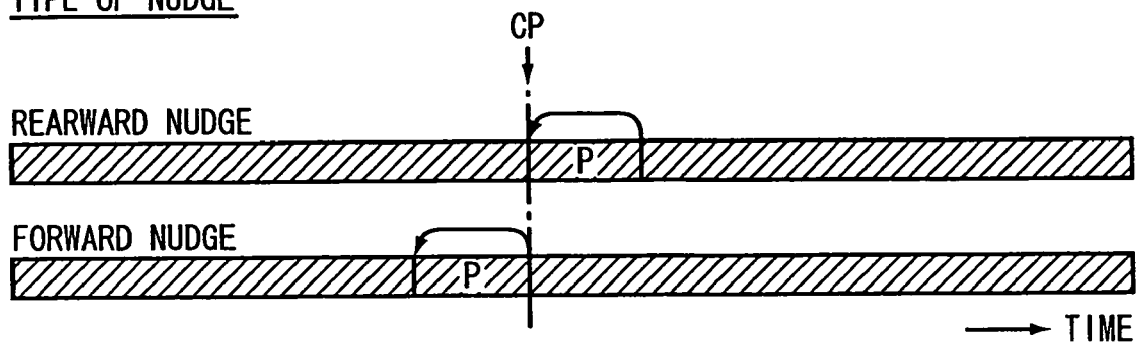
FIGS. 9a and 9b are schematic views explaining operations in a nudge mode.

The "nudge mode" means that a short period (for example, 25 to 800 msec), namely, a loop part, of one track of song management data is repeatedly loop-reproduced. As shown in FIG. 9a, there are two types of nudges, namely, a forward nudge and a rearward nudge. Here, the "rearward nudge" means a loop part P present on a time axis rearward from the current point CP. The "forward nudge" means a loop part P present on the time axis forward from the current point CP. The forward nudge is used to detect a rising portion of a waveform, whereas the rearward nudge is used to detect a falling portion of a waveform. In FIG. 9, the arc arrow indicated on each loop part P represents that, after reproduction of the waveform data of the section is carried out up to the trailing end of the section, it is continuously executed again from the leading end of the section, that is, represents a loop reproduction of the waveform data of the section.

For example, when the rising portion of waveform is detected, the current point CP is set at a position slightly forward from the rising portion of waveform. Thereafter, the JOG dial is operated to gradually shift the current point CP in a rearward direction. The audio signal nudge-reproduced in this case is initially mute, but generates sound when the current point CP reaches the rising portion of the audio signal. Accordingly, the current point CP, at which generation of sound is begun, corresponds to the rising portion of waveform. The length of the loop part P can be appropriately set within a range of 25 to 800 msec by the user through the operator set 6.

Hereinafter, a method for using the buffer memory 50 in the nudge mode will be described. Although each of the track regions 52-0 to 52-15 are divided into buffer regions A to F in the above-described normal reproduction mode, each track region 52-K ("K" is a track NO.) is made up of an integral buffer region in the nudge mode. The track region 52-K is tightly filled without any gaps, with blocks. Furthermore, although the contents of the buffer regions are not constant in the normal reproduction mode because, when a mute block is reproduced, waveform data is muted by the mute circuit 60, there is no occasion that the mute circuit 60 mutes an audio signal in the nudge mode because "0" is always stored in the buffer region associated with a mute block in the nudge mode. In the nudge mode, accordingly, the mute register 74 is not used ("0" is always set for a mute flag).

Also, when the operation mode is changed from the normal reproduction mode to the nudge mode, it is natural that the block, at which the current point CP is positioned when the normal reproduction mode is executed, and blocks positioned around the block have already been transferred to the track region 52-K. Since the method for using the track region 52-K in the nudge mode is different from that in the normal reproduction mode, as described above, all blocks set in the normal reproduction mode are rendered null in the nudge mode. Accordingly, blocks are set in the track region 52-K in accordance with the method associated with the nudge mode.

Hereinafter, the operation for setting blocks in the buffer memory 50 will be summarized with reference to FIG. 10. In the same track as that of FIG. 6*a*, the current point CP is first positioned in the block BL5, as shown in FIG. 10*a*. It is assumed that the operation mode is changed to the nudge mode in the state of FIG. 10*a*. It is also assumed that the nudge in this case is a rearward nudge, and the loop part P ranges between the block BL5 and the mute block Z just following the block BL5. In this case, all blocks associated with the loop part P (in the illustrated example, the block BL5 and the mute block just following the block BL5) are set for the track region 52-K. Accordingly, it is possible to repeatedly read the loop part P. The range of sample points, for which setting of blocks is made, is referred to as a "block setting completion range". The leading sample point in the block setting completion range is referred to as a setting completion leading point HP, and the trailing sample point in the block setting completion range is referred to as a setting completion trailing point TP. Also, the leading sample point of the loop part P is referred to as a loop start point LS, and the trailing sample point of the loop part P is referred to as a loop end point LE. In accordance with the type of the nudge, one of the loop start point LS or loop end point LE corresponds to the current point CP.

A successive block is added to the side of the setting completion leading point HP or setting completion trailing point TP (in the illustrated example, the setting completion leading point HP) where there is no redundancy in terms of the number of samples when viewing at opposite ends of the loop part P. That is, the block BL4 is added. FIG. 10*b* shows the state in which the block BL4 is added. Subsequently, the blocks BL6, BL3, and BL7 are alternately added to the setting completion trailing point TP and setting completion leading point HP, as shown in FIGS. 10*c* to 10*e*. Accordingly, it can be seen that block setting is carried out in a state in which there is a sufficient redundancy in terms of the number of samples at the forward and rearward sides of the loop part P. In this case, as shown in FIGS. 10*c* to 10*e*, when the loop part P is shifted in a downward direction, there is no redundancy in terms of the number of samples at the rearward side, whereas there is an excessive redundancy in terms of the number of samples at the forward side. In this case, the block BL3 positioned at the most forward side is released. As a result, the number of empty samples in the track region 52-K is increased. Accordingly, the block BL8 successive to the rearward side is transferred to the track region 52-K.

Figure 9B:
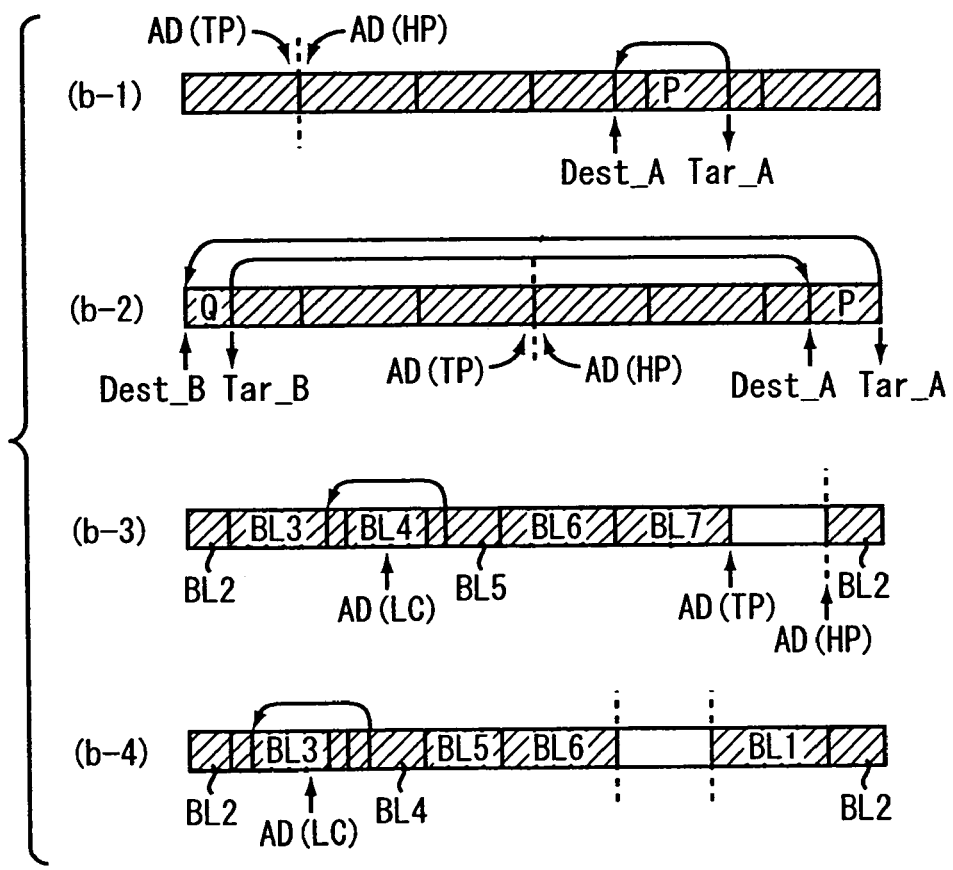

Next, the state in which the above-described multiple blocks are set for the track region 52-K will be described with reference to FIG. 9*b*. In the nudge mode, the track region 52-K is used as a ring buffer. In FIG. 9*b*-1, the address AP(HP) is an address at which the sample associated with the setting completion leading point HP is stored. When it is assumed that each of the set blocks has the cluster capacity Scr, the block of "6" is stored in the track region 52-K. The address earlier than the address AD(HP) by "1" is set as an address AD(TP) associated with the setting completion trailing point TP.

In the nudge mode, the register sets Reg_A and Reg_B of the track-corresponding register group 66-K are also used to represent the loop part. The remaining register sets Reg_C to Reg_F are not used. Where the loop part P is set in successive memory regions, one of the register sets Reg_A and Reg_B, for example, the register set Reg_A, is designated for HEAD and TAIL regions. Thereafter, the range A from the start address Dest_A to the end address Tar_A set in the register set Reg_A is repeatedly reproduced. The address AD(LS) associated with the loop start point LS of the loop part P is stored as the start address Dest_A in the start position register 70. Also, the address AD(LE) associated with the loop end point LE of the loop part P is stored as the end address Tar_A in the end position register 72. Thus, the loop part P is repeatedly reproduced. Meanwhile, since the register set Reg_B not set for the HEAD and TAIL regions is not used in the reproduction operation, the start address Dest_B and end address Tar_B may be set to any values.

Meanwhile, the loop part may be set to range between the leading address and trailing address of the track region 52-K, so as to enable the track region 52-K to be used as a ring buffer. For example, the loop part may be divided into portions P and Q, as shown in FIG. 9*b*-2. In this case, the register set Reg_A is set for the HEAD region, and the register set Reg_B is set for the TAIL region. The range A from the start address Dest_A to the end address Tar_A set in the register set Reg_A, and the range B from the start address Dest_B to the end address Tar_B set in the register set Reg_B are alternately reproduced. The address AD(LS) associated with the loop start point LS and the leading address of the track region 52-K are stored as the start addresses Dest_A and Dest_B in the start position register 70, respectively. Also, the trailing address of the track region 52-K and the address AD(LE) associated with the loop end point LE are stored as the end addresses Tar_A and Tar_B in the end position register 72, respectively. Thus, the contents of the portions P and Q are alternately reproduced.

When the loop part is shifted from a state of FIG. 9*b*-1 to a state of FIG. 9*b*-2, setting is changed from the state, in which one of the register sets is designated for the HEAD and TAIL regions, to the state in which the register sets Reg_A and Reg_B are designated for the HEAD and TAIL regions, respectively. On the other hand, when the loop part is shifted from a state of FIG. 9*b*-2 to a state of FIG. 9*b*-1, setting is changed from the state, in which the register sets Reg_A and Reg_B are designated for the HEAD and TAIL regions, respectively, to the state, in which one of the register sets is designated for the HEAD and TAIL regions. Thus, the loop part can be appropriately reproduced, irrespective of any shift of the loop part in the track region 52-K used as a ring buffer, because two register sets Reg_A and Reg_B are used.

The number of samples in each block may not correspond to the cluster capacity Scr. For this reason, as blocks are sequentially set in the track region 52-K, an empty region (a portion not indicated by oblique lines) having a certain number of empty samples Sr (Sr<Scr) is generally formed, as shown in FIG. 9*b*-3. Also, each block may not be continuously set in the track region 52-K. There may be an occasion in which a block, for example, the block BL2, may be set in the trailing and leading portions of the track region 52-K in a divided manner. When the loop center LC positioned at the center of the loop part (LS, LE) is shifted toward the setting completion leading point HP such that a predetermined block release condition is satisfied (for example, when the difference between both points is less than two times the cluster capacity Scr), the block BL7 positioned at an outermost position at the side of the setting completion trailing point TP is released. When the number of empty samples Sr is not less than the cluster capacity Scr in accordance with the block release, the block BL1 adjacent to the block BL2 is added.

3.2.2. Nudge Starting Event

Figure 11A:
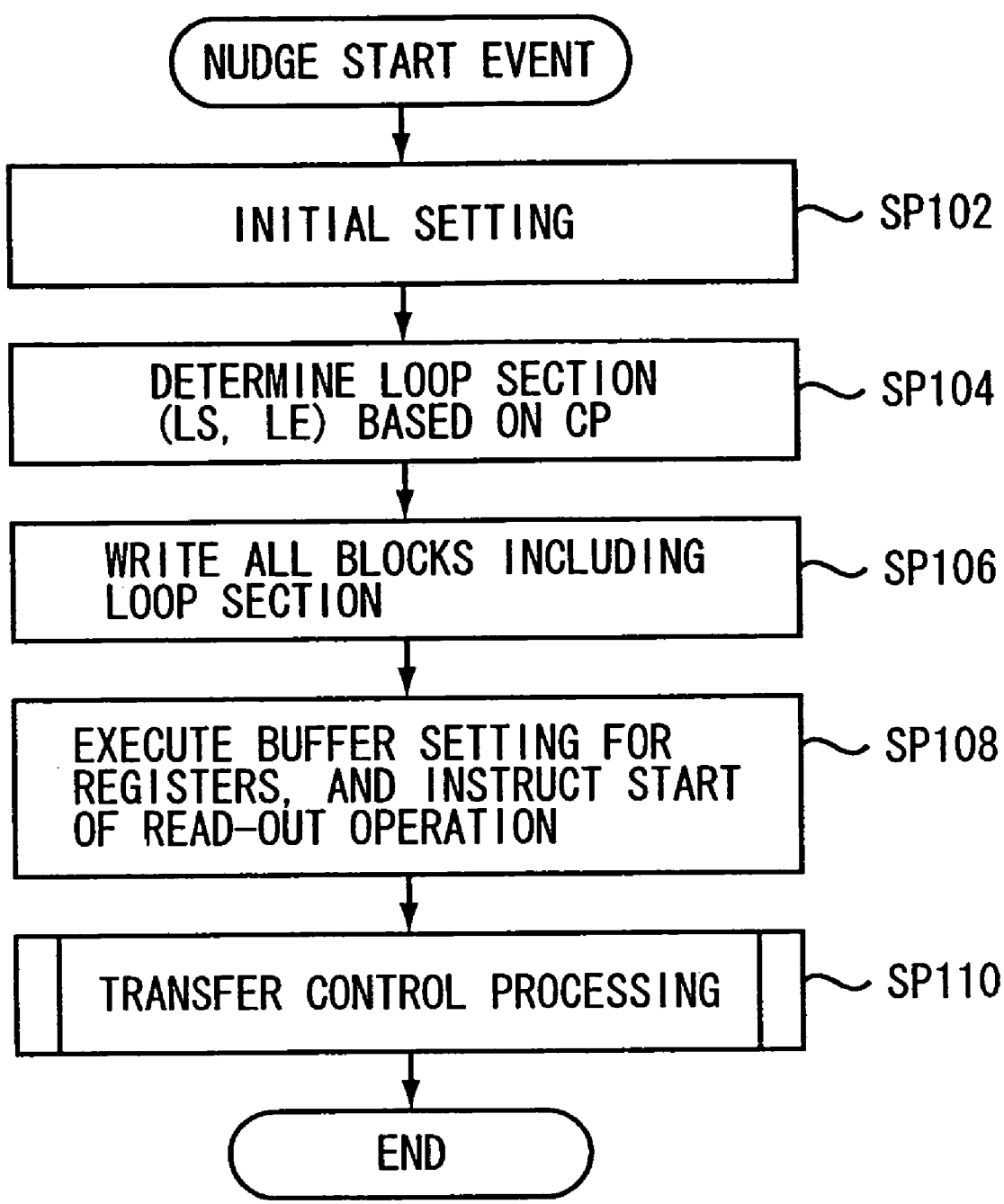
FIGS. 11a, 11b and 11c are flow charts of a routine for processing a variety of events in the nudge mode.

When an operation for changing the operation mode from the normal reproduction mode to the nudge mode is carried out in the operator set 6, a nudge starting event routine shown in FIG. 11a is begun.

When the routine proceeds to step SP102 in the drawing, a predetermined initial setting operation is executed. Although a variety of waveform data have been appropriately stored in the track region 52-K in the normal reproduction mode before the change of the operation mode to the nudge mode, all pieces of the waveform data stored in the normal reproduction mode are disregarded when the operation mode is changed to the nudge mode. That is, such waveform data is re-transferred from the hard disk 30 in accordance with desired processes, which will be described hereinafter, if necessary.

When the routine then proceeds to step SP104, the loop part (LS, LE) on the time axis of the song management data, namely, the loop start point LS and loop end point LE, are determined, based on the current point CP, the type of the nudge, and the length L1 of the loop part. That is, when the type of the nudge is a forward nudge, the loop part (LS, LE) is determined such that "Loop Start Point LS=Current Point CP−Loop part Length L1", and "Loop End Point LE=Current Point CP". On the other hand, when the type of the nudge is a rearward nudge, the loop part (LS, LE) is determined such that "Loop Start Point LS=Current Point CP", and "Loop End Point LE=Current Point CP+Loop part Length L1".

When the routine subsequently proceeds to step SP106, all blocks including the loop part (LS, LE) are fixedly determined, and are written in the track region 52-K of the buffer memory 50. That is, for blocks constituting a region, waveform data from the hard disk 30 is written in the track region 52-K in cluster units. In this case, non-reproduction portions of the waveform data are deleted, and only the reproduction portions of the waveform data fill the track region 52-K at the forward side on the time axis. For blocks constituting a mute section, "0" is written in the track region 52-K, correspondingly to the length of the blocks. When the routine then proceeds to step SP108, setting necessary for the track-corresponding register group 66-K is executed. The start addresses Dest_A and Dest_B, end addresses Tar_A and Tar_B, HEAD region, and TAIL region are also set, based on the loop part (LS, LE). When the routine subsequently proceeds to step SP110, the transfer control processing routine (FIG. 12), which will be described later, is called. Waveform data is transferred to the track region 52-K, if necessary.

3.2.3. JOG Dial Operation Event Processing

Hereinafter, operations carried out when a variety of events are generated in the nudge mode will be described in detail.

Figure 11B:
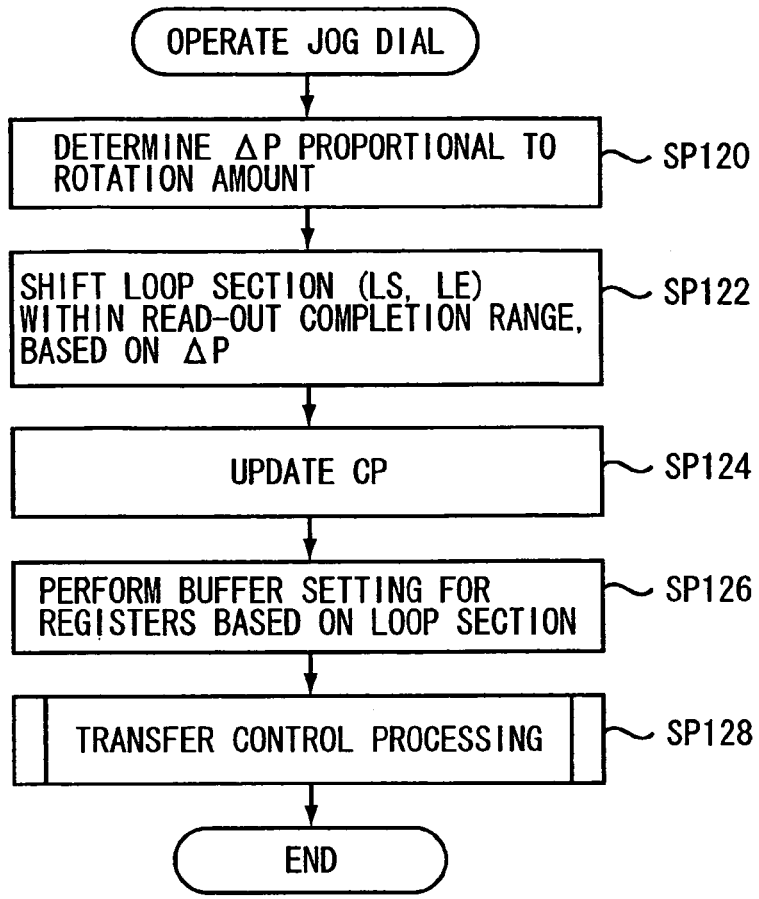

When the JOG dial is operated in the nudge mode, a JOG dial operation even processing routine shown in FIG. 11b is begun. When the routine proceeds to step SP120 in the drawing, a current point shift designation value ΔP proportional to the rotation amount of the JOG dial is determined. When the routine subsequently proceeds to step SP112, the loop part (LS, LE) is shifted within the block setting completion range (HP, TP). That is, the current point shift designation value ΔP is added to the loop start point LS and loop end point LE, so long as the loop part (LS, LE) is within the block setting completion range (HP, TP), respectively. When "LE+ΔP" exceeds the setting completion trailing point TP, the difference between both values is set to "ΔP1". In this case, accordingly, a new loop part (LS, LE) is set using "LS+ΔP−ΔP1" and "LE+ΔP−ΔΔP1". Similarly, when the current point shift designation value ΔP is negative, there may an occasion in which "LS+ΔP" is less than the setting completion leading point HP. In this case, the difference between both values is set to "ΔP2", and a new loop part (LS, LE) is set using "LS+ΔP+ΔP2" and "LE+ΔP+ΔP2". In this embodiment, however, such an occasion does not occur unless the JOG dial is excessively rapidly rotated, because the buffer region has a plurality of blocks.

When the routine then proceeds to step SP124, the current point CP is determined, based on the updated loop part (LS, LE). That is, the current point CP corresponds to the loop end point LE when the type of the nudge is a forward nudge. On the other hand, when the type of the nudge is a rearward nudge, the current point CP corresponds to the loop start point LS. When the routine subsequently proceeds to step SP126, setting necessary for the track-corresponding register group 66-K is executed, based on the updated loop part (LS, LE). The start addresses Dest_A and Dest_B, end addresses Tar_A and Tar_B, HEAD region, and TAIL region are also set, based on the loop part (LS, LE). When the routine subsequently proceeds to step SP128, the transfer control processing routine (FIG. 12), which will be described later, is called. Waveform data is transferred to the track region 52-K, if necessary.

3.2.4. Transfer Control Processing

Hereinafter, the transfer control processing routine, which is called at steps SP110, SP128, etc., will be described with reference to FIG. 12.

When the routine proceeds to step SP150 in the drawing, it is determined whether or not read data or data to be written is being transferred between the IDE interface 28 and the buffer memory 50. When a determination of "YES" is made, this routine is immediately ended. On the other hand, when a determination of "NO" is made, the routine proceeds to step SP152. At step SP152, an average value of the loop start point LS and loop end point LE, namely, the loop center LC, is calculated.

When the routine then proceeds to step SP154, the number of samples present from the loop center LC toward the setting completion leading point HP, namely, the number of leading-side samples, Sa, and the number of samples present from the loop center LC toward the setting completion trailing point TP, namely, the number of trailing-side samples, Sb, are calculated. Thereafter, the total number of samples, "Sa+Sb", in the block setting completion range (HP, TP) is deducted from the total capacity of the track region 52-K (cluster capacity Scr·6), to derive the number of empty samples, Sr, in the track region 52-K. When the routine subsequently proceeds to step SP156, it is determined whether or not the empty sample number Sr is not less than the cluster capacity Scr. When a determination of "YES" is made in this case, the routine proceeds to step SP158.

At step SP158, a new block is added to a smaller side of the sample numbers Sa and Sb, based on the song management data. That is, when the block to be newly added is a block constituting a region, data of the cluster containing the waveform data of the block is read, and transfer of the read data is begun. On the other hand, when the block to be newly added is a mute block, "0" is written in the track region 52-K, correspondingly to the number of samples identical to the length of the block. In accordance with the addition of the block, the setting completion leading point HP or setting completion trailing point TP is corrected.

When the routine then proceeds to step SP164, it is determined whether or not a mute block has been set at step SP158. When a determination of "YES" is made in this case, the routine returns to step SP154, to re-calculate the sample numbers Sa and Sb, and the empty sample number Sr. The processes following step SP156 are then executed. This is because there is no problem even when the process for setting the next block is continuously executed-in that the setting of the mute block is immediately completed. On the other hand, when a determination of "NO" is made at step SP164, this routine is immediately ended. That is, this routine is ended for the moment because the transfer of waveform data from the hard disk 30 to the track region 52-K is carried out by the IDE interface 28 and transfer circuit 26 without any assistance of the CPU 8, and a considerable time is taken for queuing of clusters.

When the empty sample number Sr is less than the cluster capacity Scr, a determination of "NO" is made at step SP156. In this case, the routine proceeds to step SP160. At step SP160, it is determined whether or not any one of the leading-side sample number Sa and trailing-side sample number Sb is less than "2Scr" (predetermined block release condition). When a determination of "NO" is made in this case, this routine is immediately ended. In this case, the leading-side sample number Sa and trailing-side sample number Sb have approximately identical values, respectively. Accordingly, waveform data is stored in the track region 52-K at forward and rearward sides from the current point CP in an approximately balanced state.

Meanwhile, when one of the sample numbers Sa and Sb is less than "2Scr", a determination of "YES" is made at step SP160. In this case, the routine proceeds to step SP162. At step SP162, the outermost block of the other one of the sample numbers Sa and Sb (the larger sample number side) is released. Based on the release, the block setting completion range (HP, TP) is updated. When the routine subsequently proceeds to step SP154, the sample numbers Sa and Sb, and the empty sample number Sr are re-calculated. Thereafter, the loop of steps SP154, SP156, SP160, and SP162 is repeatedly executed until the empty sample number Sr is not less than the cluster capacity Scr. When the empty sample number Sr is not less than the cluster capacity Scr, the routine proceeds to step SP158. At step SP158, a new block is added to the smaller side of the sample numbers Sa and Sb.

3.2.5. Transfer Ending Interrupt Processing

Figure 11C:
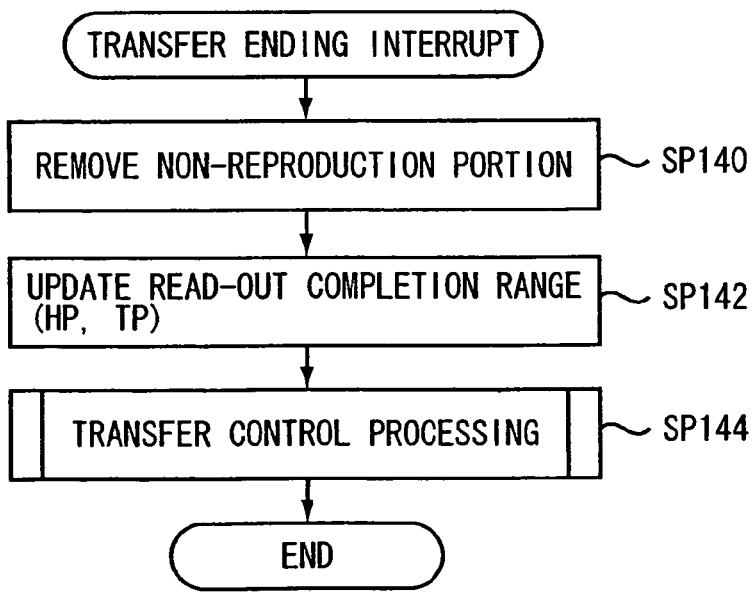

During transfer of clusters from the hard disk 30 to the track region 52-K begun at step SP158 of the transfer control processing routine (FIG. 12), the transfer address is counted up every time data of one address is transferred. When the transfer address corresponds to the end address EAD stored in the end address register 94, a transfer ending interrupt is generated from the CPU 8. As a result, a transfer ending interrupt routine shown in FIG. 11c is begun.

When the routine proceeds to step SP140 in the drawing, a non-reproduction portion of the transferred waveform data of one cluster (a portion other than the block to be newly added) is removed, and the remaining reproduction portion is shifted to be adjacent to the block setting completion range (HP, TP). When the routine then proceeds to step SP142, the setting completion leading point HP or setting completion trailing point TP is updated, in order to add the shifted reproduction portion to the block setting completion range (HP, TP). When the routine subsequently proceeds to step SP144, the transfer control processing routine (FIG. 12) is again called.

Thus, in the nudge mode, when the JOG dial is operated, the contents of the track region 52-K are updated in order to enable the sample numbers Sa and Sb at the forward and rearward sides from the loop center LC to secure "2Scr" because the transfer control processing routine (FIG. 12) may be repeatedly executed, if necessary. Accordingly, it is possible to increase the possibility that a new loop part (LS, LE) is rendered to be within the block setting completion range (HP, TP) when the JOG dial is re-operated, and thus, to rapidly reproduce the new loop part (LS, LE).

4. EFFECTS OF EMBODIMENT

As apparent from the above description, in the normal reproduction mode, values such as the start addresses Dest_A to Dest_F, end addresses Tar_A to Tar_F, and mute flags MUTE_A to MUTE_F can actually be set, considerably earlier than the reproduction of data. Accordingly, the setting of the buffer memory 50 or the like can be executed for a sufficient time. For example, even when there is a cluster having a very short reproduction range, it is possible to prevent an occasion that the setting performed when reproduction of waveform data is begun cannot be achieved within a given time.

Also, in the nudge mode, although the track region 52-K has a capacity corresponding to 6 times the cluster capacity Scr, it is possible to store waveform data of a sufficient number of samples in the track region 52-K even when there are clusters having a very short reproduction range, because only a reproduction portion of each cluster is stored. In addition, it is possible to immediately carry out the loop part (LS, LE) even when the current point CP is greatly shifted, because waveform data is positioned at the forward and rearward sides of the loop part (LS, LE) in a balanced state.

5. MODIFIED EMBODIMENTS

The present invention may be variously modified without being limited to the above-described embodiment, for example, as follows:

(1) Although the track having a minimum number of remaining samples is selected from the tracks each having an empty buffer region, as a track for which block setting must be subsequently performed, at step SP24 in the above-described embodiment, the track having a minimum number of remaining blocks, namely, a minimum number of blocks which have not yet been reproduced, (in other words, the track having a maximum number of empty buffer regions), may be selected as a track for which block setting must be subsequently performed.

(2) Although it is determined at step SP160 in the above-described embodiment whether or not the sample number Sa or Sb (namely, the number of samples present from the loop center LC to the setting completion leading point HP or setting completion trailing point TP) is less than "2Scr", it may be possible to calculate the number of samples present from the loop part (LS, LE) to each of the setting completion leading point HP and setting completion trailing point TP, to determine whether or not any one of the results of the calculation is less than a predetermined value, and to release, when an affirmative determination is made, the block of the side other than the side associated with the affirmative determination.

(3) It is also unnecessary to fix the number of buffers for each track in the normal reproduction mode. For example, 6 or more buffer regions may be allocated to a track in which the number of reproduction samples per one cluster is reduced in accordance with a repeated editing operation, and 5 or less buffer regions may be allocated for a track in which the number of reproduction samples per one cluster is relatively large.

(4) The threshold value "2Scr" in the nudge mode of the above-described embodiment is an example of a threshold value determined to effectively use the track region 52-K of 6 clusters, and so, may have other values. Generally, when the track region 52-K has a size of n clusters, it is preferred that the threshold value be on the order of $(n/2-\alpha)$ clusters ($\alpha$ is a constant having a range of "$0.5 \leq \alpha \leq 1.0$). Also, when the size of the track region 52-K is not an integral-number multiple of the number of samples m in one cluster, it is preferred that the size be set to be n samples, and the threshold value be on the order of $(n/2-\alpha \cdot m)$ samples.

(5) In the above-described embodiment, the block release condition is determined in accordance with whether or not any one of the forward-side sample number Sa and rearward-side sample number Sb is not more than the threshold value. In this case, when there are samples of a number not more than a predetermined threshold value at one of the forward and rearward sides from the center of the loop part, the outermost one of the blocks at the other side is released to prepare a block at the side in question. Accordingly, samples of a number not less than the predetermined threshold value can be prepared at either side.

However, the block release condition may not be limited to the above-described condition.

For example, the block release condition may be determined in accordance with whether or not any one of the forward-side sample number Sa and rearward-side sample number Sb is not less than a threshold value. In this case, it is preferred that, when the number of samples of the track region 52-K is n, and the number of samples in one cluster is m, the threshold value be on the order of $(n/2+\alpha \cdot m)$ samples. In this case, when samples of a number not less than a predetermined threshold value are prepared at one of the forward and rearward sides from the center of the loop part, a block is released from the side containing a larger number of samples, and a block is prepared at the other side, in accordance with the above-described block release condition. Accordingly, it is possible to prevent an excessive number of samples from being prepared at one side, and thus, to prevent the number of samples prepared at the other side from being insufficient.

Alternatively, the block release condition may be determined in accordance with whether or not the absolute value of the difference between the forward-side sample number Sa and the rearward-side sample number Sb is not less than a threshold value. In this case, it is preferred that, when the number of samples of the track region 52-K is n, and the number of samples in one cluster is m, the threshold value be on the order of $(\alpha \cdot m)$ samples. In this case, when the difference between the number of samples prepared at the forward side from the center of the loop part and the number of samples prepared at the rearward side from the center of the loop part number is not less than a predetermined threshold value, a block is released from the larger sample number side, and a block is prepared at the other side, in accordance with the above-described block release condition. Accordingly, it is possible to prevent an excessive number of samples from being prepared at one side, and thus, to prevent the number of samples prepared at the other side from being insufficient.

As described above, the one aspect of the present invention is characterized by a configuration summarized below. Here, elements in parentheses are references for illustrative purposes. In accordance with one aspect, the present invention provides a waveform data processing apparatus comprising transfer section (26, 86, 88) which reads out waveform data of multiple tracks stored in a first storage device (30) in data units (clusters) each made up of a predetermined number of samples, and which transfers the read waveform data to a second storage device (50) having an access speed higher than an access speed of the first storage device, a reproduction section (62, 64) which reads out, one sample by one sample, the waveform data of each of the tracks from the second storage device for every sampling period, and which reproduces the read waveform data, and a transfer control section (8) which updates the waveform data, for which read has been ended in the second storage device, whereby audio signals of each of the tracks are continuously reproduced, wherein the transfer control section (8) transfers, from the first storage device (30) to track regions provided in respective tracks, pieces of the waveform data corresponding to respective track regions (52-K), in an order of tracks having a smaller number of non-reproduced samples or in an order of tracks having a smaller unit (cluster) of non-reproduced data.

Preferably, the transfer control section (8) includes: an additional transfer determination section (SP22) which determines whether or not waveform data can be further transferred to the second storage device (50), in response to completion of the transfer of waveform data of one data unit from the first storage device (30) to the second storage device (50) in association with one of the tracks; and an additional transfer instructing section (SP34) which instructs the transfer section (28, 86, 88) to continuously transfer new waveform data of one data unit (cluster) to the second storage device (50), under a condition in which the results of the determination by the additional transfer determination section (SP22) is affirmative.

Preferably, the waveform data processing apparatus comprises: a mute flag storing section (74) which stores a mute flag (MUTE_X) for every block of waveform data having a size not larger than the data unit, the mute flag designating whether or not the audio signal associated with the block in question is to be muted when the block in question is reproduced; and a mute section (60) which mutes the audio signal in a period in which the block designated to be muted by the mute flag is reproduced.

Preferably, the second storage device (50) includes at least three buffer regions (A to F) each having a storage capacity corresponding to the data unit (cluster). The waveform data processing apparatus further comprises a designation section which designates one of the buffer regions as a first buffer region (HEAD region), and designates another one of the buffer regions as a second buffer region (TAIL region). The reproduction section begins reproduction of the first buffer region when reproduction of the second buffer region is completed, and reproduces the buffer regions, except for the first and second buffer regions, in a predetermined default reproduction order (alphabetical order).

In accordance with another form, the present invention provides a waveform data processing apparatus comprising: a first storage device (30, 102) which stores sound data in storage units of clusters; a second storage device (50) which includes a plurality of storage regions (buffer regions (A to F) each capable of storing sound data of one cluster, and setting a reproduction range (Dest_X, Tar_X), and has an access speed higher than an access speed of the first storage device, the plurality of storage regions comprising at least three storage regions usable for reproduction of sound data in a predetermined order; a third storage device (30) which stores management data (104, 106) representing a plurality of blocks, to be sequentially reproduced, in a track, the management data designating sound data of one cluster stored in the first storage device for an associated one of the blocks, and designating a reproduction range of the sound data to be reproduced; a reproduction section (62, 64) which performs reproduction of the plurality of the storage regions in a predetermined order, the reproduction section reproducing the designated reproduction range of the sound data in each storage region; and a next block preparation section (SP20 to SP34) which sequentially prepares next block reproduction for the storage regions of the second storage device, for which reproduction has been completed by the reproduction section, based on the management data (104, 106), the next block preparation section reading out the sound data of one cluster in a next block from the first storage device (30, 102), based on the management data, transferring the read sound data to an associated one of the reproduction-completed storage regions, and setting a reproduction range (Dest_X, Tar_X) of the sound data (SP34).

In accordance with still another form, the present invention provides a waveform data processing apparatus comprising: a first storage device (30, 102) which stores sound data in storage units of clusters; a second storage device (50) which includes a plurality of storage regions usable for reproduction of sound data in a predetermined order (HEAD region, TAIL region and alphabetical order), each of the storage regions (buffer regions A to F) being capable of storing sound data of one cluster, and setting the sound data to be reproduced in the form of sound or mute, and has an access speed higher than an access sped of the first storage device; a third storage device (30, 104, 106) which stores management data representing a plurality of sound blocks or mute blocks, to be sequentially reproduced, in a track, the management data designating (using region data) sound data of one cluster stored in the first storage device for an associated one of the sound blocks, and designating a reproduction range of the sound data to be reproduced, while designating a time length for each of the mute blocks (designating the time length of the mute block using the length of a period in which no region data is present); a reproduction section (62, 64) which performs reproduction of the plurality of the storage regions in a predetermined order, the reproduction section reproducing the stored sound data for the storage regions set to be reproduced in the form of sound, while reproducing mute data for the storage regions set to be reproduced in the form of mute; and a next block preparation section (SP20 to SP34) which sequentially prepares next block reproduction for the storage regions of the second storage device, for which reproduction has been completed by the reproduction section, based on the management data, the next block preparation section setting reproduction of sound for one of the reproduction-completed storage regions in association with a next block designated by the management data, when the next block is a sound block by reading out the sound data of one cluster in the next block from the first storage device, and transferring the read sound data to the associated reproduction-completed storage region (P34), while setting reproduction of mute for the associated reproduction-completed storage region when the next block designated by the management data is a mute block (SP30).

In accordance with still another form, the present invention provides a waveform data processing apparatus for simultaneously reproducing sound data of multiple tracks comprising: a first storage device (30) which stores sound data in storage units of clusters; a second storage device (50) which includes, for each of the tracks, a plurality of storage regions each capable of storing sound data of one cluster, and setting a reproduction range (Dest_X, Tar_X), and has an access speed higher than an access speed of the first storage device, the plurality of storage regions (buffer regions A to F) comprising at least three storage regions usable for reproduction of the sound data in associated one of the tracks in a predetermined order (HEAD region, TAIL region and alphabetical order); a third storage device (30, 104, 106) which stores management data representing a plurality of blocks, to be sequentially reproduced, in each of the tracks, the management data designating sound data of one cluster stored in the first storage device for an associated one of the blocks, and designating a reproduction range of the sound data to be reproduced; a reproduction section (62, 64) which performs reproduction of the plurality of the storage regions in a predetermined order for each of the tracks, the reproduction section reproducing the designated reproduction range of the sound data in each storage region; and a next block preparation section (SP20 to SP34) which prepares next block reproduction for the storage regions, for which reproduction has been completed, based on the management data associated with one of the tracks, when the reproduction-completed storage regions are associated with the track (SP30, SP34), the next block preparation section reading out the sound data of one cluster in a next block from the first storage device, based on the management data associated with the track, transferring the read sound data to an associated one of the reproduction-completed storage regions, and setting a reproduction range of the sound data, wherein, when the reproduction-completed storage regions are associated with at least two of the tracks, the next block preparation section prepares the next block reproduction in an order of tracks including non-reproduced storage regions having a smaller amount of sound data, to be reproduced (SP24: order of tracks having a smaller number of samples), or in an order of tracks having a smaller number of non-reproduced storage regions (modified embodiment (1): order of tracks having a smaller number of remaining blocks).

In accordance with the other aspect of the present invention, there is provided a waveform data processing apparatus comprising: a transfer section (28, 86, 88) which reads out waveform data stored in a first storage device (30) in data units (clusters) each made up of a predetermined number of samples, and which transfers the read waveform data to a second storage device (50) having an access speed higher than an access speed of the first storage device; a loop part determination section (6) which determines a loop part (LS, LE), to be loop-produced, of the waveform data stored in the second storage device (50); a empty region determination section (SP156) which determines whether or not there is an empty region (Sr) having a size of not less than the data unit (cluster) in the second storage device (50); waveform data designation section (SP158) which repeatedly designates waveform data to be transferred to the transfer section (28, 86, 88), in order to add waveform data to the second storage device adjacent to one side of a leading point (HP) and a trailing point (TP) of a waveform data storing range approaching the loop part (LS, LE) in a period in which the determination result of the empty region determination section is affirmative; a release condition determination section (SP160, modified embodiment) which determines whether or not the number of samples from one of the leading and trailing points to a center of the loop part satisfies a predetermined block release condition in accordance with a shift of the loop part; and a release section (SP162) which releases a storage region storing waveform data at one side of the leading and trailing points spaced apart from the loop part under conditions in which the determination result of the empty region determination section is negative, and the determination result of the release condition determination section is affirmative.

What is claimed is:

1. A waveform data processing apparatus comprising:
    a transfer section which reads out waveform data of multiple tracks stored in a first storage device in data units, each data unit being made up of a predetermined number of samples, and which transfers the read waveform data to a second storage device having an access speed higher than an access speed of the first storage device;
    a reproduction section which reads out, one sample by one sample, the waveform data of each of the tracks from the second storage device for every sampling period, and which reproduces an audio signal according to the read waveform data; and
    a transfer control section which replaces old waveform data which has been read from the second storage device by new waveform data which is read from the first storage device, whereby the audio signals of each of the tracks are continuously reproduced, wherein
    the transfer control section controls the transfer section to transfer, from the first storage device to track regions provided in the second storage device for respective tracks, pieces of the waveform data corresponding to the respective track regions, in an order of the tracks having a smaller number samples of non-reproduced waveform data or in an order of the tracks having a smaller number units of non-reproduced waveform data.

2. The waveform data processing apparatus according to claim 1, wherein the transfer control section includes:
    an additional transfer determination section which determines whether or not waveform data can be further transferred to the second storage device, in response to completion of the transfer of waveform data of one data unit from the first storage device to the second storage device in association with one of the tracks; and
    an additional transfer instructing section which instructs the transfer section to continuously transfer new waveform data of another data unit to the second storage device, under a condition that the results of the determination by the additional transfer determination section is affirmative.

3. The waveform data processing apparatus according to claim 1, further comprising:
    a mute flag storing section which stores a mute flag for every block of waveform data having a size not larger than the data unit, the mute flag designating whether or not the audio signal associated with the block in question is to be muted when the block in question is reproduced; and
    a mute section which mutes the audio signal in a period during which the block designated to be muted by the mute flag is reproduced.

4. The waveform data processing apparatus according to claim 1, wherein the second storage device has each track region which includes at least three buffer regions each having a storage capacity corresponding to the data unit, the apparatus further comprising:
    a designation section which designates one of the buffer regions as a first buffer region, and designates another one of the buffer regions as a second buffer region,
    wherein the reproduction section begins reproduction of the first buffer region when reproduction of the second buffer region is completed, and reproduces the buffer regions except for the first and second buffer regions in a predetermined default reproduction order.

5. A waveform data processing apparatus comprising:
    a first storage device which stores sound data in storage units of clusters;
    a second storage device which includes a plurality of storage regions each capable of storing sound data of one cluster, and each capable of setting therein a reproduction range, and which has an access speed higher than an access speed of the first storage device, the plurality of the storage regions comprising at least three storage regions usable for reproduction of sound data in a predetermined order;
    a third storage device which stores management data indicating a plurality of blocks, to be sequentially reproduced for a track, the management data designating sound data of one cluster stored in the first storage device for an associated one of the blocks, and designating a reproduction range of the sound data to be reproduced as one block;
    a reproduction section which performs reproduction of the plurality of the storage regions in a predetermined order, the reproduction section reproducing the designated reproduction range of the sound data in each storage region; and
    a next block preparation section which sequentially prepares next block reproduction for a storage region of the second storage device, for which reproduction has been completed by the reproduction section, based on the management data, the next block preparation section reading out the sound data of one cluster for a next block from the first storage device, based on the management data, then transferring the read sound data to the reproduction-completed storage region where the reproduction has been completed, and setting a reproduction range of the sound data for the next block.

6. A waveform data processing apparatus comprising:
    a first storage device which stores sound data in storage units of clusters;
    a second storage device which includes a plurality of storage regions usable for reproduction of sound data in a predetermined order, each of the storage regions being capable of storing sound data of one cluster, and being capable of setting the sound data to be reproduced in the. form of sound or mute, and which has an access speed higher than an access speed of the first storage device;
    a third storage device which stores management data indicating a plurality of sound blocks or mute blocks, to be sequentially reproduced for a track, the management data designating sound data of one cluster stored in the first storage device for an associated one of the sound blocks, and designating a reproduction range of the sound data to be reproduced for the sound block, while designating a time length for each of the mute blocks;

a reproduction section which performs reproduction of the plurality of the storage regions in a predetermined order, the reproduction section reproducing the stored sound data of the storage regions set to be reproduced in the form of sound, while muting the stored sound data of the storage regions set to be reproduced in the form of mute; and a next block preparation section which sequentially prepares next block reproduction for a storage region of the second storage device, for which reproduction has been completed by the reproduction section, based on the management data, the next block preparation section setting reproduction of sound for the storage region where the reproduction is completed in association with a next block designated by the management data, when the next block is a sound block, by reading out the sound data of one cluster for the next block from the first storage device, and transferring the read sound data to the storage region where the reproduction has been completed, while setting reproduction of mute for the storage region where the reproduction has been completed when the next block designated by the management data is a mute block.

7. A waveform data processing apparatus for simultaneously reproducing sound data of multiple tracks, comprising:

a first storage device which stores sound data in storage units of clusters;

a second storage device which includes, for each of the tracks, a plurality of storage regions each capable of storing sound data of one cluster, and each capable of setting therein a reproduction range, and which has an access speed higher than an access speed of the first storage device, the plurality of the storage regions comprising at least three storage regions usable for reproduction of the sound data in a predetermined order for each track;

a third storage device which stores management data indicating a plurality of blocks, to be sequentially reproduced, in each of the tracks, the management data designating sound data of one cluster stored in the first storage device for one block, and designating a reproduction range of the sound data to be reproduced for the one block;

a reproduction section which performs reproduction of the plurality of the storage regions in a predetermined order for each of the tracks, the reproduction section reproducing the designated reproduction range of the sound data in each storage region; and a next block preparation section which prepares next block reproduction for a storage region for which reproduction has been completed, based on the management data of one track where the reproduction of the storage region is completed, the next block preparation section reading out the sound data of one cluster for a next block from the first storage device, based on the management data associated with the track, transferring the read sound data to an associated one of the storage regions for which the reproduction has been completed, and setting a reproduction range of the sound data for the next block, wherein, when there are at least two of the tracks where reproduction of storage regions have been completed, the next block preparation section prepares the next block reproduction in an order of tracks including non-reproduced storage regions having a smaller amount of sound data to be reproduced, or in an order of tracks having a smaller number of non-reproduced storage regions.

8. A waveform data processing apparatus comprising:

a transfer section which reads out waveform data stored in a first storage device in data units, each data unit being made up of a predetermined number of samples, and which transfers the read waveform data to a second storage device to provide therein a waveform data storing range, the second storage device having an access speed higher than an access speed of the first storage device;

a loop part determination section which determines a loop part, to be loop-produced, of the waveform data stored in the second storage device;

an empty region determination section which determines whether or not there is an empty region having a size of not less than the data unit in the second storage device;

a waveform data designation section which repeatedly designates waveform data to be transferred for the transfer section, in order to add waveform data to the second storage device adjacent to one of a leading point and a trailing point of the waveform data storing range, which is closer to the loop part in a period during which the determination result of the empty region determination section is affirmative;

a release condition determination section which determines whether or not the number of samples from one of the leading point and the trailing point to a center of the loop part satisfies a predetermined block release condition during the course of a shift of the loop part; and a release section which releases a storage region storing the waveform data at one side of the leading point and the trailing point, which is farther from the loop part under conditions where the determination result of the empty region determination section is negative, and the determination result of the release condition determination section is affirmative.

9. The waveform data processing apparatus according to claim 8, wherein the waveform data designation section causes the transfer section to secure a number of samples more than a predetermined threshold value (th) of not less than the data unit from the center of the loop part, in accordance with the repeated designation of the waveform data, and the release condition determination section determines, as the block release condition, whether or not the number of samples from one of the leading and trailing points to the center of the loop part becomes less than the predetermined threshold value (th) during the course of the shift of the loop part.

10. The waveform data processing apparatus according to claim 9, wherein, when the total number of samples storable in the second storage device is n, the number of samples in the data unit is m, $\alpha$ is a constant having a range of $0.5 \leq \alpha \leq 1.0$, the predetermined threshold value (th) is expressed as follows:

$$th = n/2 - \alpha \cdot m.$$

11. The waveform data processing apparatus according to claim 8, wherein the release condition determination section determines, as the block release condition, whether or not the number of samples from one of the leading and trailing points to the center of the loop part becomes more than a predetermined threshold value (th) during the course of the shift of the loop part.

12. The waveform data processing apparatus according to claim 11, wherein, when the total number of samples storable in the second storage device is n, the number of samples in the data unit is m, $\alpha$ is a constant having a range of $0.5 \leq \alpha \leq 1.0$, the predetermined threshold value (th) is expressed as follows:

$$th = n/2 + \alpha \cdot m.$$

13. The waveform data processing apparatus according to claim 8, wherein the release condition determination section determines, as the block release condition, whether or not a difference between respective numbers of samples from the leading and trailing points to the center of the loop part becomes more than a predetermined threshold value (th) during the course of the shift of the loop part.

14. The waveform data processing apparatus according to claim 13, wherein, when the total number of samples storable in the second storage device is n, the number of samples in the data unit is m, $\alpha$ is a constant having a range of $1.0 \leq \alpha \leq 1.5$, the predetermined threshold value (th) is expressed as follows:

$$th = \alpha \cdot m.$$

* * * * *